US010174932B2

(12) United States Patent
Rosenblum

(10) Patent No.: US 10,174,932 B2
(45) Date of Patent: Jan. 8, 2019

(54) UNIVERSALLY ATTACHABLE LIGHT ACCESSORY APPARATUS FOR USE WITH MOBILITY AIDS, SYSTEM, AND METHOD OF USE

(71) Applicant: Neal Rosenblum, Hollywood, FL (US)

(72) Inventor: Neal Rosenblum, Hollywood, FL (US)

( * ) Notice: Subject to any disclaimer, the term of this patent is extended or adjusted under 35 U.S.C. 154(b) by 0 days.

(21) Appl. No.: 15/384,165

(22) Filed: Dec. 19, 2016

(65) Prior Publication Data

US 2017/0175997 A1 Jun. 22, 2017

Related U.S. Application Data

(60) Provisional application No. 62/270,242, filed on Dec. 21, 2015.

(51) Int. Cl.
| | |
|---|---|
| *F21V 33/00* | (2006.01) |
| *F21V 21/08* | (2006.01) |
| *H05B 33/08* | (2006.01) |
| *F21V 23/00* | (2015.01) |
| *G08B 21/04* | (2006.01) |
| *A61H 3/04* | (2006.01) |

(Continued)

(52) U.S. Cl.
CPC ............ *F21V 33/0064* (2013.01); *A45B 3/04* (2013.01); *A61H 3/02* (2013.01); *A61H 3/04* (2013.01); *F21V 21/0816* (2013.01); *F21V 23/003* (2013.01); *G08B 21/043* (2013.01); *G08B 21/0461* (2013.01); *H05B 33/0854* (2013.01); *H05B 37/0236* (2013.01); *A61H 2201/0184* (2013.01); *A61H 2201/0188* (2013.01); *A61H 2201/5007* (2013.01); *A61H 2201/5048* (2013.01); *A61H 2201/5058* (2013.01); *A61H 2201/5069* (2013.01); *A61H 2201/5092* (2013.01); *A61H 2201/5097* (2013.01); *F21S 9/02* (2013.01); *F21V 23/0492* (2013.01); *F21Y 2115/10* (2016.08); *H05B 37/0218* (2013.01)

(58) Field of Classification Search
CPC .............. A61G 5/00; A61H 2003/0205; A61H 2201/0184; A61H 2201/5007; A61H 2201/5028; A61H 2201/5069; A61H 2201/5097; A61H 3/00; A61H 3/02; A61H 3/04; G08B 21/0415; G08B 21/0461
USPC ................................ 340/539.4, 4.1
See application file for complete search history.

(56) References Cited

U.S. PATENT DOCUMENTS

| | | | |
|---|---|---|---|
| 4,837,666 A | 6/1989 | Conkle | |
| 5,331,990 A * | 7/1994 | Hall | A45B 3/00 135/65 |

(Continued)

*Primary Examiner* — Emily C Terrell
(74) *Attorney, Agent, or Firm* — One LLP; Jonathan Jaech

(57) ABSTRACT

An attachable light accessory for a walker illuminates the forward and downward walking direction of an individual when using the walker. The light accessory includes a housing, a power source, and a plurality of light modules attached to the housing, a controller, and a plurality of sensors including a bump sensor, tip sensor, and light sensor. An adaptor mount is removeably attached to the light accessory, which may be attached to horizontal cross-member of the walker to allow the light accessory to be installed and retrofitted on any existing walker. The light accessory also includes a sound activated sensor for remotely activating the light accessory to help identify the location of the walker in dark areas, an audible alarm that is activated when the walker tips over, and other control and sensor features.

18 Claims, 21 Drawing Sheets

(51) Int. Cl.
*A45B 3/04* (2006.01)
*A61H 3/02* (2006.01)
*F21S 9/02* (2006.01)
*H05B 37/02* (2006.01)
*F21V 23/04* (2006.01)
*F21Y 115/10* (2016.01)

(56) References Cited

U.S. PATENT DOCUMENTS

| | | |
|---|---|---|
| 6,930,603 B2 | 8/2005 | Jackson |
| 7,963,294 B1 * | 6/2011 | Trout ................. A61H 3/00 135/66 |
| 8,608,183 B2 | 12/2013 | Woo |
| 8,810,407 B1 * | 8/2014 | Nolan ................. A61H 3/02 340/407.1 |
| 2004/0095251 A1 * | 5/2004 | Jackson ............. G08B 21/0446 340/686.6 |
| 2008/0084690 A1 | 4/2008 | Rappl |
| 2008/0225513 A1 | 9/2008 | Durfee et al. |
| 2009/0056777 A1 | 3/2009 | Lawhead |
| 2009/0310364 A1 | 12/2009 | Turner |
| 2012/0313535 A1 * | 12/2012 | Bedell ............. H05B 37/0227 315/158 |
| 2013/0014790 A1 * | 1/2013 | Van Gerpen ............. A61H 3/04 135/66 |
| 2013/0069543 A1 * | 3/2013 | Mohan ............. G08B 17/12 315/155 |
| 2014/0192516 A1 * | 7/2014 | Zimmerman ............. A45B 3/04 362/102 |
| 2016/0074262 A1 * | 3/2016 | Moses ................. A61H 3/04 180/219 |
| 2016/0341410 A1 * | 11/2016 | Kohn ............. F21V 23/0464 |

* cited by examiner

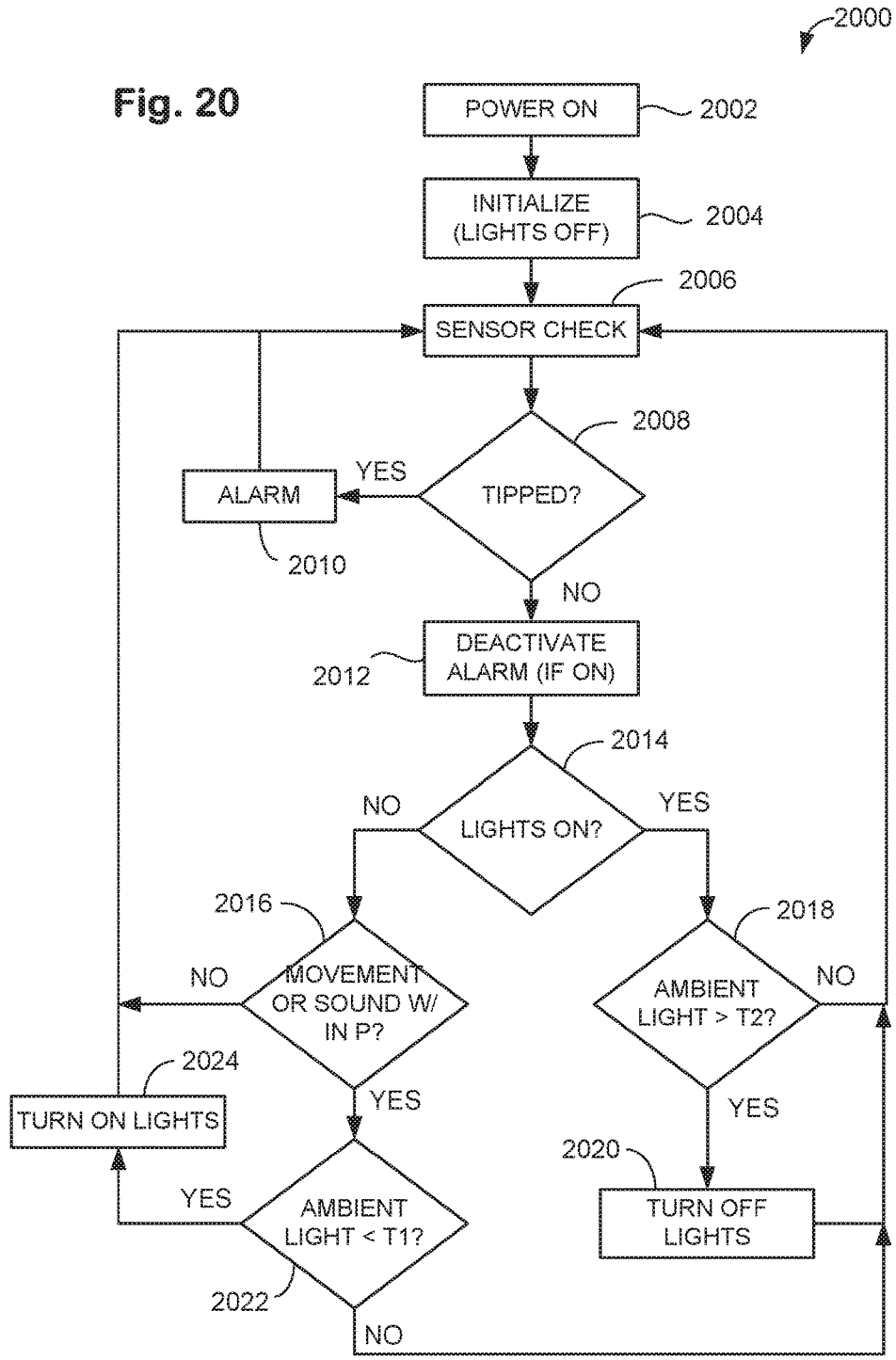

UNIVERSALLY ATTACHABLE LIGHT ACCESSORY APPARATUS FOR USE WITH MOBILITY AIDS, SYSTEM, AND METHOD OF USE

CROSS-REFERENCE TO RELATED APPLICATIONS

This application claims priority to U.S. provisional application Ser. No. 62/270,242, filed Dec. 21, 2015, which application is specifically incorporated herein, in its entirety, by reference.

FIELD

The present disclosure relates to systems, apparatus and methods for aiding mobility by the elderly or disabled, and more particularly for providing and controlling illumination for mobility aids such as, for example, canes, walking sticks, wheel chairs, crutches, walkers (with or without wheels or brakes), or other mobility assist devices.

BACKGROUND

Traditional mobility aids, or walking aids, are generally used by the handicapped, elderly, or disabled to assist them in maintaining their balance while walking or ambulating from place to place. Some examples of walking aids include canes, walking sticks, wheel chairs, crutches, walkers, portable lifts, and other mobility assist devices. One popular walking aid often seen in hospitals and assisted living or nursing homes is the conventional, or traditional, walker. Traditional walkers typically include a tubular metal frame articulated to form four vertical legs and two horizontal handrails separated from each other by a plurality of horizontal structural members, or rails, and pivots in order to provide for foldability and to help orient an individual between a left handrail and a right handrail for grasping the walker with both hands in the walker's unfolded state. A set of rotating wheels, tennis balls, or rubber feet, or combination thereof, are often situated on the lower ends of the two or more vertical legs to reduce friction and improve mobility of the walker when pushing the walker forward during use. Some walkers also include braking devices used to prevent the front wheels from rotating and quickly stopping the walker from moving forward.

Particular environmental settings often pose a challenge for individuals using a walker. For example, a person may have difficulty locating a walker or maneuvering with the walker in dark environments or areas having dim lighting. The challenge is heightened for those individuals having difficulty seeing as a result of an ophthalmological disease, disorder or disability. In some circumstances, walkers are often used during the night and early morning hours to provide the individual with the mobility needed to visit the restroom, acquire drinks or food from the kitchen, seek assistance from a nursing staff member, or simply to move about as a result of not being able to sleep. As a result of the insufficient lighting, the elderly may have impaired ability to maneuver the walker, difficulty in locating a walker in a dark room, negotiating the walker safely around the environment, and mobilizing through doors and along corridors. These challenges may result in an individual losing their balance and risking a fall when attempting to access the walker or when maneuvering the walker in a dark space.

Conventional prior art devices have attempted to address the issue of using walkers in dark or low lit areas by providing a means of illuminating the forward direction or surrounding area of the walker during use. For example, some walkers have been equipped with lighting devices and batteries that are disposed in the hollow tubular frame of the walker to light a small perimeter near the front vertical legs of the walker. Other walkers have been provided with glow in the dark or phosphorescent materials that are disposed on the outer surface of the walker where the material illuminates for a predetermined period of time after being exposed to light. Other devices have included lighting devices that are preconfigured to fit particular walkers having certain dimensions. In some traditional prior art devices, operative switches needed to activate the lighting devices may be difficult to reach or may be difficult to actuate for those users with arthritis, amputations, or other disabilities that may render a physical switch very difficult or impossible to operate, especially if the switch is, for example, on the right side of the walker and the users right arm is affected by one of the disabilities just mentioned. For example, operative switches are often placed on lighting devices themselves, or are situated on the walker in hard to reach places forcing a user to bend or stretch in order to find the switch, risking the loss of balance and a potential fall when trying to access the switch. Further, because the walker may be difficult to locate at a distance, as when an individual is in bed or in a chair away from the walker, trying to find an operative switch to activate the lighting device may pose a challenge as again the visually impaired person may have difficulty locating the switch in the dark.

Many of the conventional prior art walkers that include such illuminating devices have certain drawbacks. For example, the inclusion of batteries and lighting devices within the tubular frame of a walker makes it difficult for repair or replacement of such hardware often depriving the individual of the walker for a period of time while repairs are being made. Further, the use of phosphorescent materials requires initial illumination for the material to irradiate. Not only is the emitted light proportional to the intensity of illumination required to activate the phosphorescent material, but the glow in the dark material only emits light for short periods of time requiring re-illumination over and over again. Also, many lighting devices are not universal and cannot be retrofitted to fit most walkers. Such lighting devices are dimensioned to fit walkers having particular dimensions or sizes. Many lighting devices provide a short forward range of illumination resulting in a limited field of illumination for a user. Further, the operative switch used in activating such lighting devices are often placed on the lighting device itself, or situated on the body of the walker in such a manner as to threaten the balance of a user when attempting to reach for the switch. Finally, the elderly may have difficulty locating the walker in a dark room, as the lighting devices must remain on at all times to indicate the location of the walker.

It would be desirable, therefore, to develop new methods, apparatus and systems, that overcome these and other limitations of the prior art, and increase the usability and safety of mobility aids by conveniently providing illumination when and where needed.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A universally attachable light accessory apparatus for a walker or other mobility aid including canes, walking sticks, wheelchairs, and crutches includes a removable illumination module for illuminating the forward walking direction and downward foot direction/location of a user when walking or ambulating with the walker in dark or low lighting environments. A system for assisting walking includes a mobility aid, such as a walker or cane, assembled to a universally attachable light accessory apparatus as summarized above.

In an aspect, the universally attachable light accessory apparatus is attachable to a walker and may be retrofitted with adaptors to fit a variety of different types of walkers. In such embodiments, the light accessory may include a generally rectangular housing having enclosing walls defining a cavity, a power source disposed within the cavity, a plurality of light modules attached to one of the enclosing walls, a control circuit including a controller and a plurality of sensors, and attachment features that provide for the ability to rigidly attach the light to the tubular members of the walker without adversely affecting the primary function of the walker and still allowing for the walker to be folded for stowing away.

In one aspect of the invention, the controller includes a microcontroller, and the plurality of sensors include a bump sensor, a tip sensor, a light sensor, and a sound sensor to provide audible activation of lights in response to an abrupt sound such as clapping hands. The bump and tip sensors may use the same sensor device, e.g., an accelerometer, and interpret the sensor data using different filters to detect different events or conditions, such as being bumped or tipping over. The light sensor may be used as an ambient light sensor for detecting the intensity of ambient light so as to activate the light accessory when in dark areas and not waste battery power running the lights in environments where there is already sufficient light for the user to clearly see ahead. Input signals provided by the sensors may be processed through an analog to digital converter (ADC) and/or other input ports on a microcontroller that has preset thresholds for each item coded into the embedded software on the microcontroller.

In another aspect, a system including a walker assembled to the universally attachable light accessory apparatus provides the benefit of illuminating a forward directional area and downward foot direction/location for a person using the walker, can be illuminated remotely to help identify the location of the walker in dark areas, and can be installed and retrofitted onto nearly any existing walker. The lighting assembly provides an audible alarm in the event the walker tips over, or even partially tips over as there is threshold tip angle hardcoded into the software.

In another aspect, a method for operating the universally attachable light accessory apparatus includes detecting at least one of motion or sound that indicates a user is rousing from sleep or rest, and activating a lighting circuit for a period of time in response to the detecting. The method further includes continuing to scan for motion or sound and deactivating the lighting circuit after a period of time if detected motion or sound has attenuated to a level indicating that the mobility aid is not in use. When powered on but not in active use, the apparatus may enter a very low power "sleep" mode to further conserve power while not in use. A bump, tip, or noise would then "wake" the apparatus up and if appropriate, power on its lights. In an aspect, activation or deactivation of the light circuit may be gradual, to avoid abrupt changes in lighting levels and provide an opportunity for the user to react to the changes in light levels as desired.

A more complete understanding of the method, system and apparatus for a universally attachable light accessory will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

In the figures described below, like reference numerals are used to indicate like elements appearing in one or more of the figures.

FIG. 20 is a flow chart illustrating aspect of a method or methods for controlling operation of a light accessory apparatus.

DETAILED DESCRIPTION

Figure 1A:
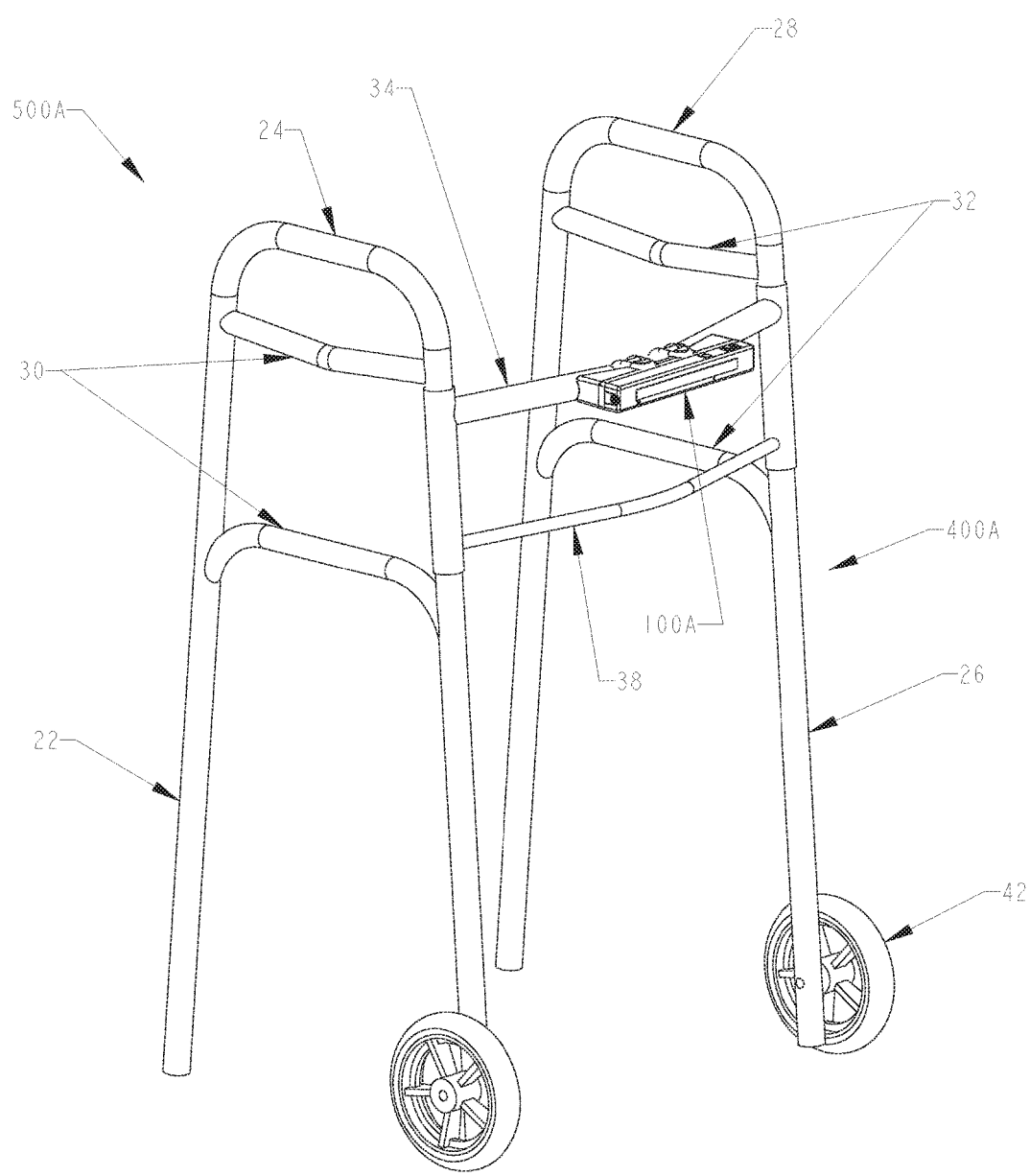
FIGS. 1A-B are perspective views showing similar embodiments of a system including a light accessory apparatus attached to a conventional walker, wherein each of the figures illustrates a different style of walker.
Figure 2A:
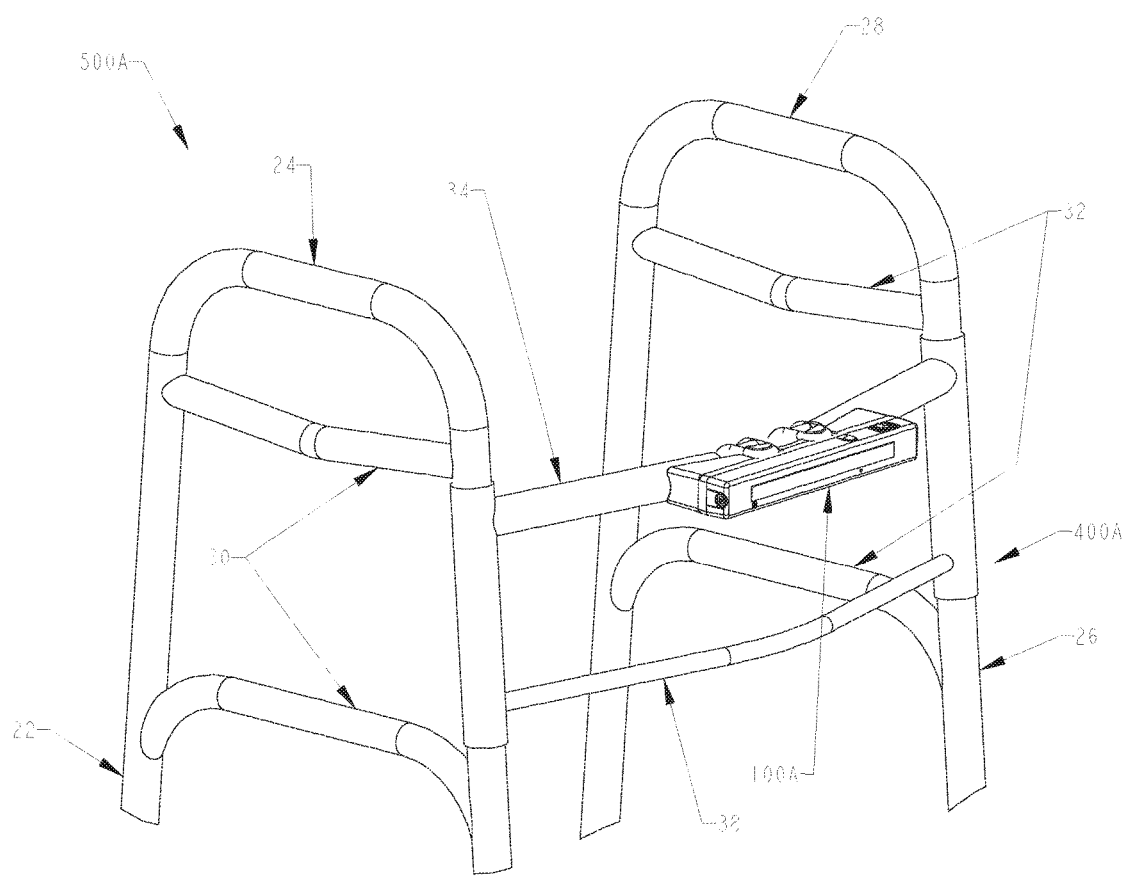
FIGS. 2A-B are magnified partial perspective views showing the systems illustrated by FIGS. 1A-B, respectively.
Figure 3A:
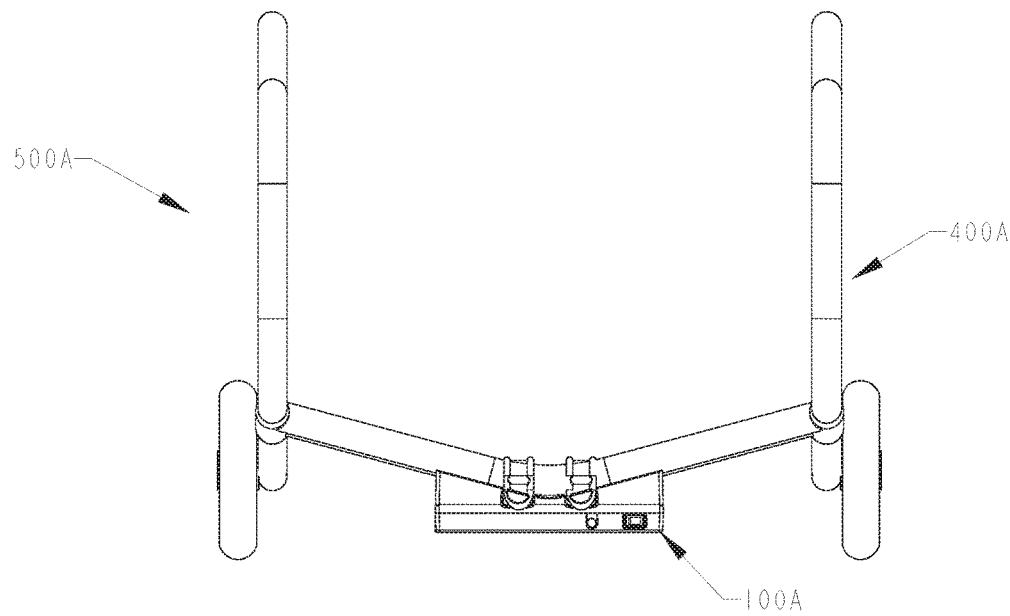
FIGS. 3A-B are top views showing the systems illustrated by FIGS. 1A-B, respectively.

Turning in detail to the drawings, FIGS. 1A, 2A, and 3A show various views of a light accessory 100A attached to the front end of a walker 500A. Walker 500A generally comprises a traditional walker 500A having a first inverted U-shape frame formed from a tubular member and articulated to define a pair of vertical legs 22 terminating at an upper right hand horizontal handle 24. A second inverted U-shaped frame defines a second pair of vertical legs 26 terminating at an upper left hand horizontal handle 28. Support braces 30, 32 are fixed to extend between each pair of the vertical legs 22, 26 respectively, about the midsection. Support braces 30, 32 enhance the structural integrity of the walker 500A and implemented to help strengthen the torsional rigidity of the legs 22, 26. The walker 500A further includes one or more front supports 34, 38, that each extend laterally across the front width of the walker 500A and attaches to each front vertical leg of the inverted U-shaped frames 26, 22. In one embodiment, a pair of wheels 42 are secured to the lower section of each front vertical leg to better assist the mobility of the walker 500A when in use. In other embodiments, the pair of wheels 42 may be replaced with tennis balls, sliders, or other devices or used in combination with wheels for the front and tennis balls for the rear of the walker to easily maneuver the walker 500A in a forward direction.

The light accessory 100A is mounted to the front end of the walker 500A using an adaptor mount 66 (FIG. 5A) that attaches to the front support 34 using elastomeric rubber straps that stretch around the horizontal frame members and hook onto lugs on the housing of the light accessory. In an alternative, or in addition, an adhesive hook-and-loop assembly or suitable adhesive-backed double-sided tape may be used to attached the light accessory to a walker. The light accessory 100A extends laterally across a portion of the front end of walker 500A to efficiently and effectively provide a broad range of illumination that is directed to the front walking direction and downward foot direction/location of the walker 500A from generally perpendicular front and bottom faces of the accessory 100A. It will be understood that the light accessory 100A is not limited for use on walkers, but that the present invention is also applicable to other walking aids used for assisting the handicapped, elderly, or disabled in walking or ambulating about.

Figure 1B:
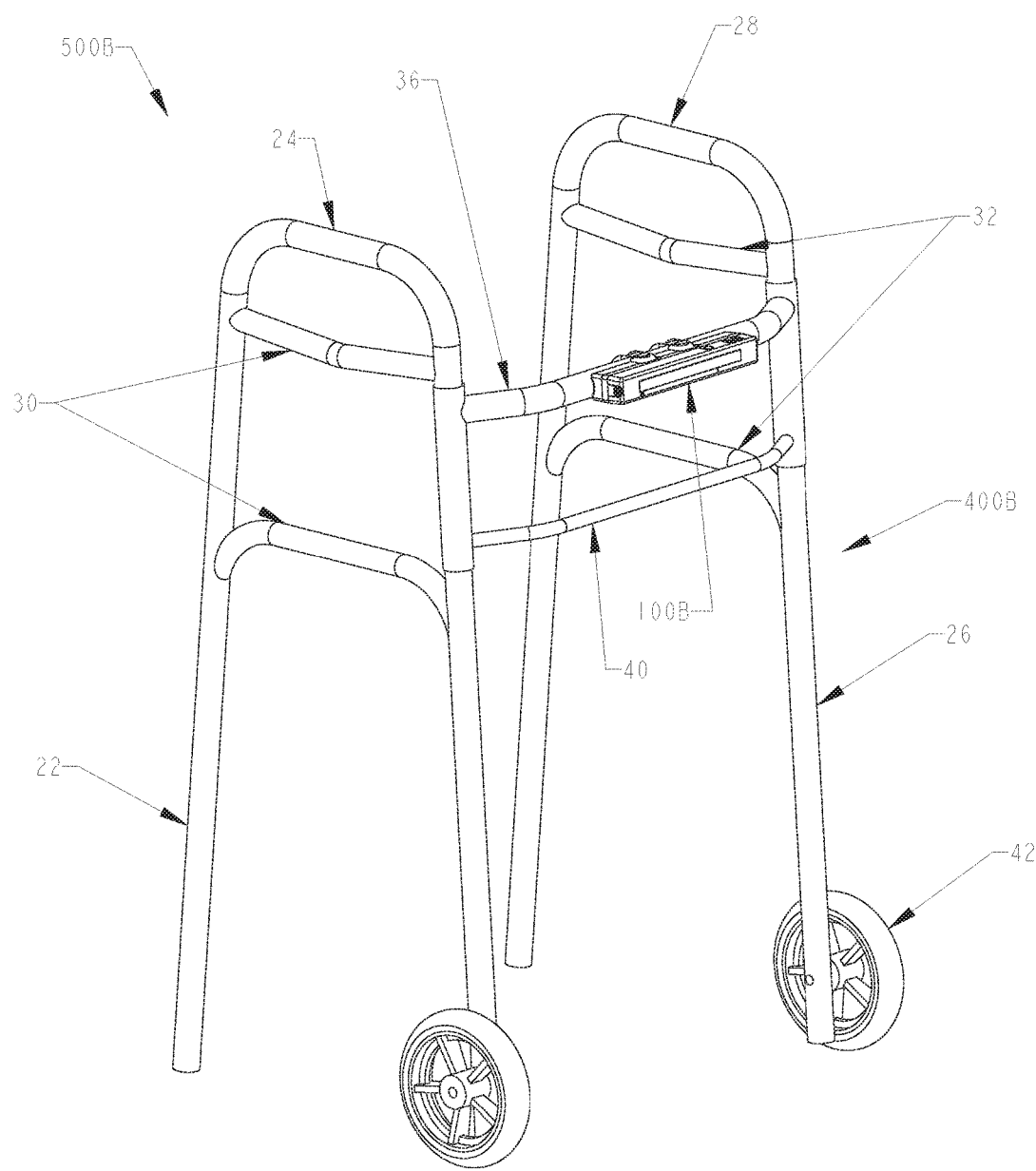
Figure 2B:
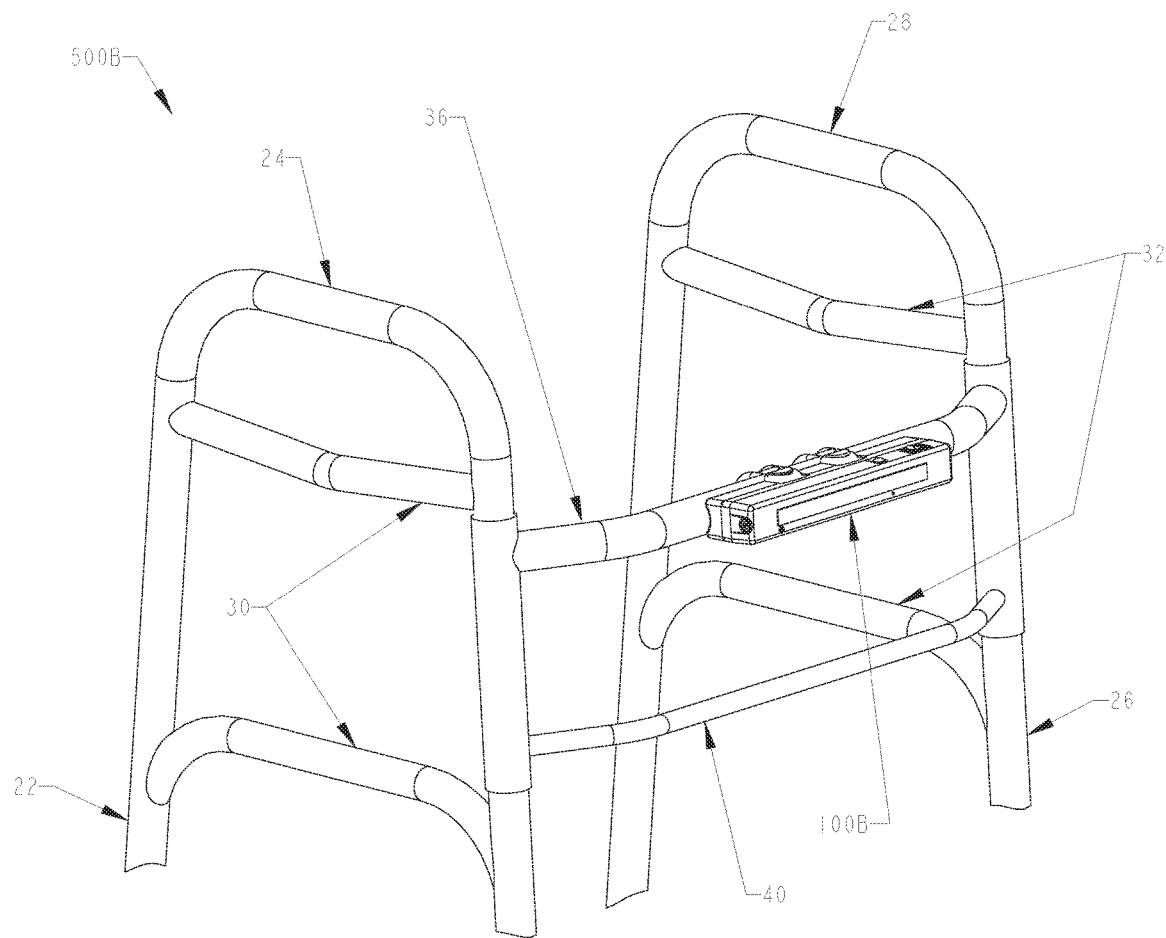
Figure 3B:
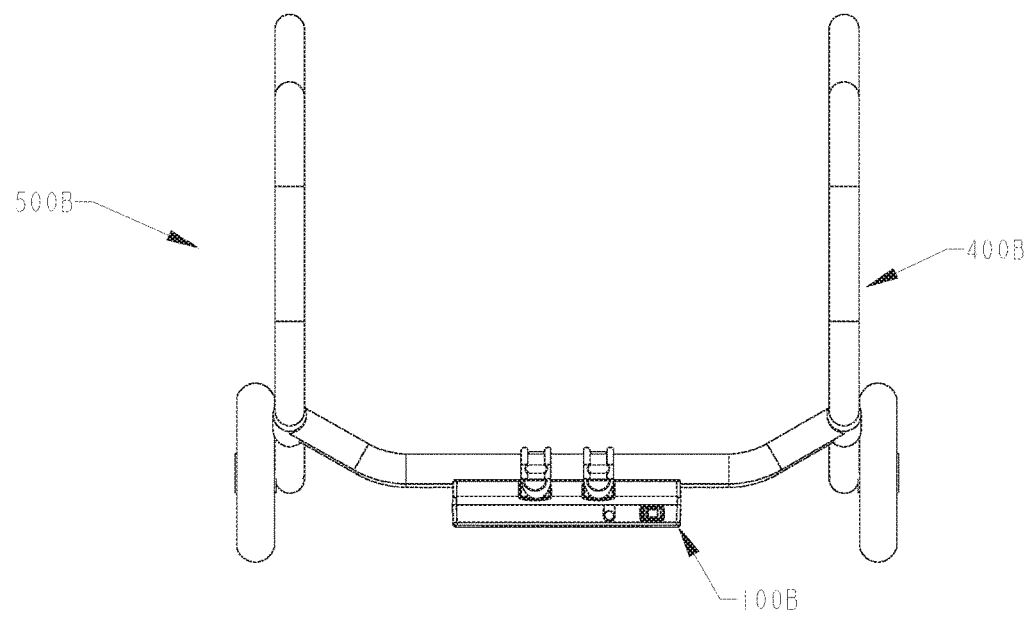

FIGS. 1B, 2B, and 3B show various views of a second light accessory 100B attached to the front end of a walker 500B. The second walker 500B has the same components as described for the first walker 500A, with the exception that the front supports 36, 40 each extending laterally across the front width of the walker 500B and attaching to each front vertical leg of the inverted U-shaped frames 26, 22 have a different shape than the corresponding supports 34, 38 of the first walker 500A. The front supports 36, 40 of the second walker 500B are straighter than the front supports 34, 38 of the first walker 500A. Accordingly, the back surface of the second light accessory 100B are shaped differently than the back surface of the first light accessory 100A; each are shaped to fit snugly against a cross support of particular shape. The different shapes can be seen clearly in the top views of FIGS. 3A-B.

Figure 4:
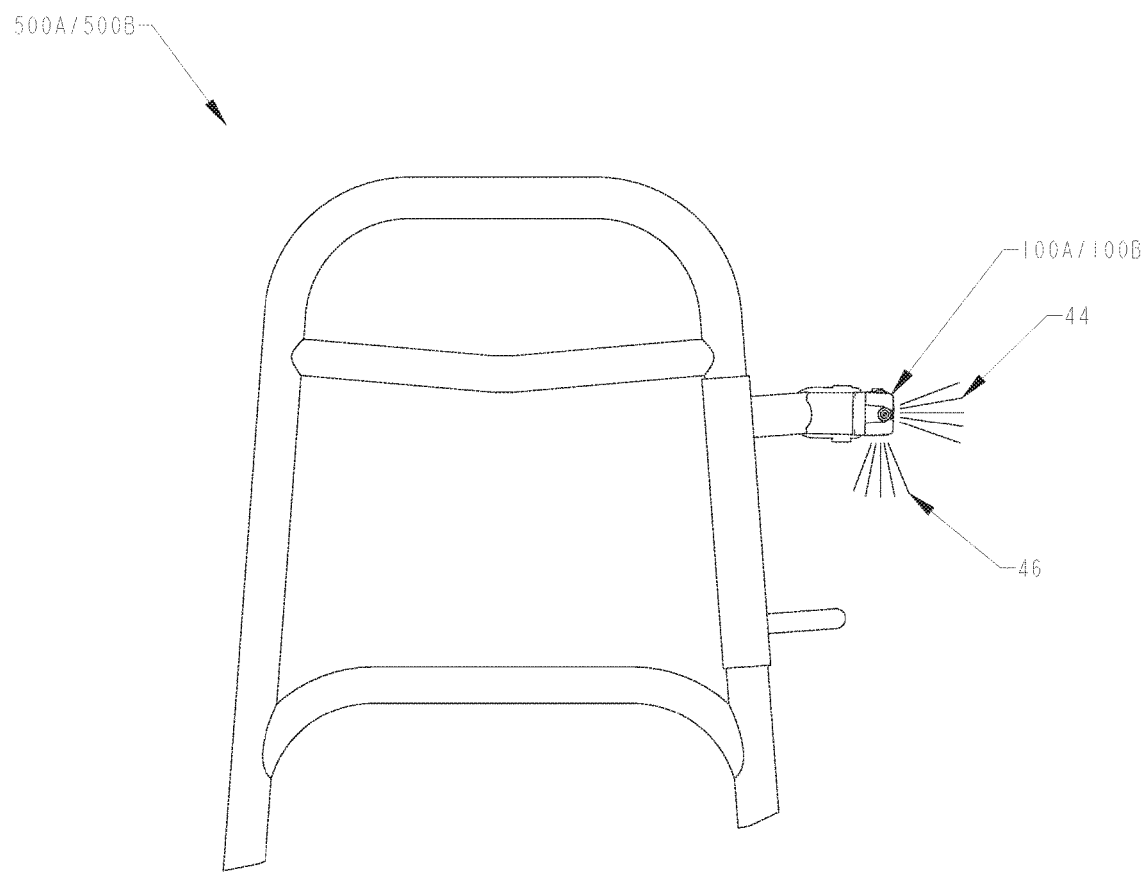
FIG. 4 is a partial side view of a system as illustrated by FIG. 1A or 1B, showing a changeable adaptor mount with the light accessory removeably attached to the adaptor.

As shown in FIG. 4, the illumination from the LEDs, or light bulbs of the light accessory 100A or 100B, radiates in both forward and downward directions 44, 46 respectively, from generally perpendicular faces of the light accessory housing. For example, three forward-facing and two downward-facing super high-brightness low-power LEDs may be used, to provide a great deal of peripheral illumination for the user. Use cases may include, for example, enabling the user to see where they are walking when awaking in the night, or when walking to their car after dark.

Referring generally to FIGS. 5A-8B, various views of the exterior of two styles of light accessories are illustrated. FIGS. 5A, 6A, 7A and 8A show a first style of light accessory, having a housing for fitting to a walker with a bent crossbar. FIGS. 5B, 6B, 7B and 8B show a second style of light accessory, having a housing for fitting to a walker with a straight crossbar. It should be appreciated that various other housing shapes may also be suitable, and housings of different shape may be adapted to fit any desired walker using flexible ties or other suitable fasteners.

Each light accessory 100A, 100B includes a front housing assembly 200 including an elongated rectangular front housing 52, and a rear housing 48, 50, also called an adaptor. When assembled, the front housing 52 and either of the rear housings 48, 50 provide having a cavity (e.g., chamber) for enclosing or attaching to electronic and mechanical components such as, for example, printed circuit boards (PCB's) and a power supply module 54 therein. A middle housing assembly 300 including a middle housing 54 may be interposed between the front housing assembly 200 and the rear adaptor 48, 50, for holding additional components, for example, batteries. The rectangular housing 52, middle housing 54 and/or adaptors 48, 50 may be fabricated from a durable, lightweight plastic, aluminum, or other material that is resistant to heating and is preferably waterproof or resistant to water in the event the light accessory 100A, 100B is exposed to a liquid substance such as water.

Each light accessory 100A, 100B further includes an adaptor mount that acts as an interface between the walker 500A-B and lighting accessory 100A, 100B. The adaptor and the lighting accessory may be fastened to the walker using one or more elastomeric loops (straps) 66 (see, e.g., FIGS. 5A-B) looped around corresponding lugs 68 integrated to rear housings 48, 50, or otherwise secured to the light accessory housing. In alternative embodiments, hook and loop fasteners such as hook-and-loop (e.g., Velcro™) or adhesive-backed double-sided tape might be used to attach the adaptor mount 48, 50 to the corresponding cross-member 34, 36. A beneficial feature of using an adaptor components 48, 50 is to allow the light accessory 100A, 100B to be retrofitted and installed on existing walkers having differing mating interface geometry. For example, numerous designs and configurations of walkers result in walkers having different dimensional configurations where the front vertical legs of one some walkers are spaced apart further or closer together than others. By providing a small number of adaptor mounts, most walkers on the market will be able to accommodate a light accessory 100A, 100B.

Figure 5A:
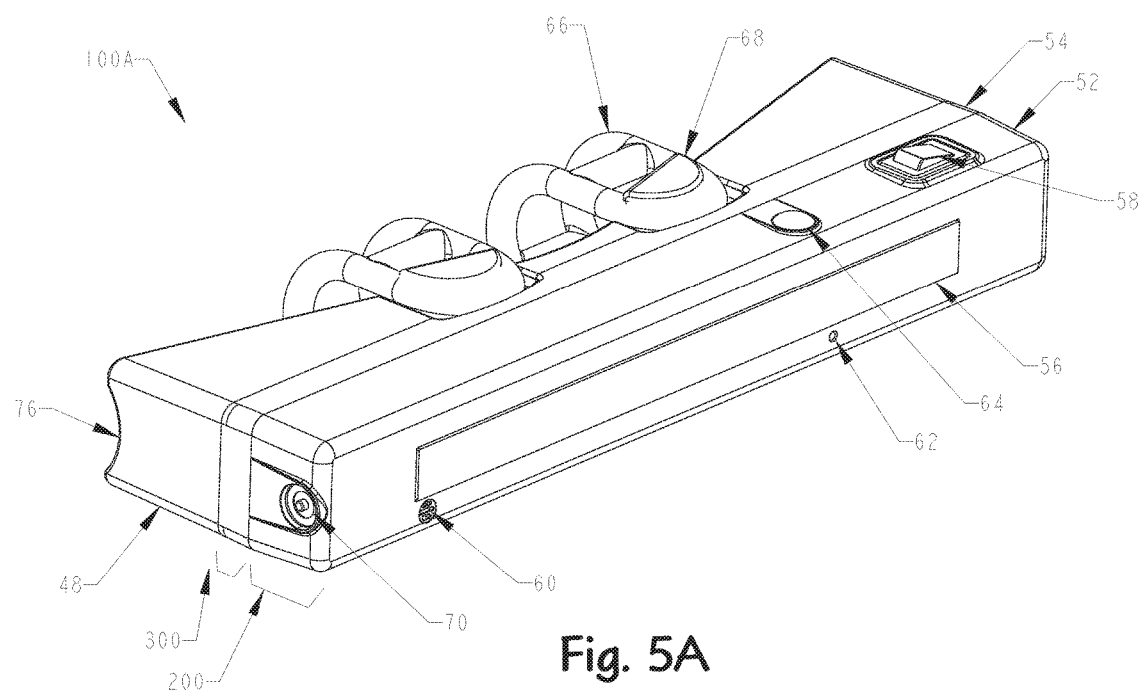
FIGS. 5A-B are perspective views of the light accessory apparatus illustrated by FIGS. 1A-B, respectively, with changeable adaptor mounts.
Figure 5B:
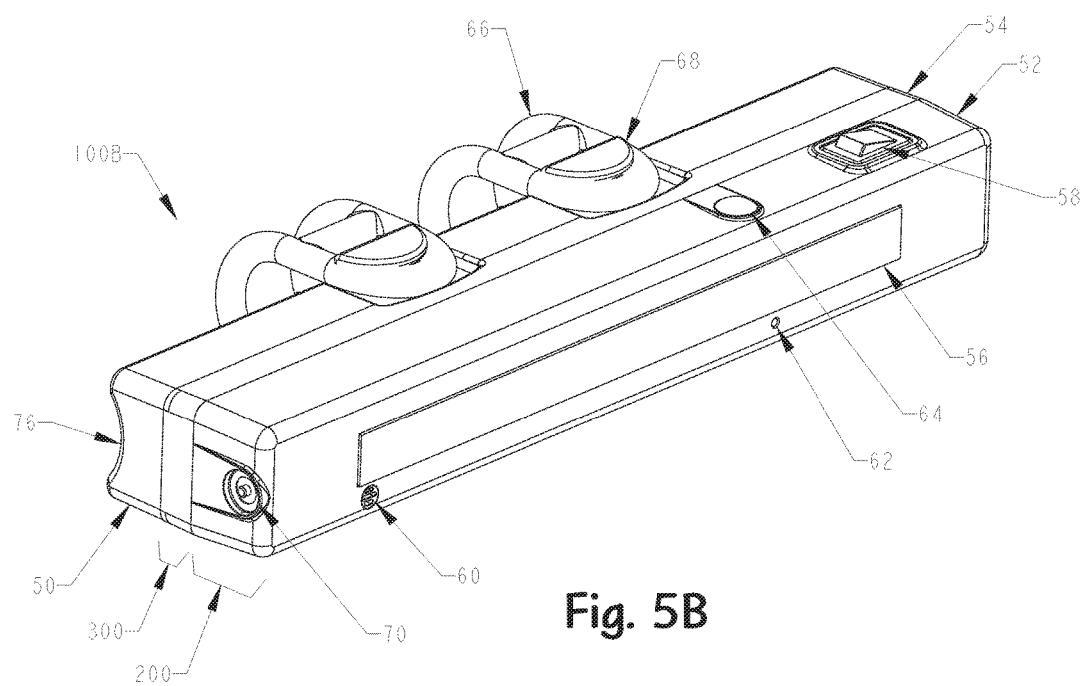

Referring to FIGS. 5A-B, a forward-facing surface of the light accessories includes a transparent front LED cover 56 that protects and insulates the LEDs installed directly beneath it. A microphone port 62 may be situated in the front surface, or other suitable location, for sensing ambient sounds. Sensitivity to sound enables smart operational features as described herein. A speaker grill 60 may likewise be provided, to facilitate sound output. Sound output may be used to sound an alarm, inform the user of the state of the light accessory (e.g., beeping when tipped or powered on), or for any desired use. A magnetic charging receptacle/adaptor 70 may be included, to couple an external power source to a USB charging port of the accessory's electronic circuit, for charging a rechargeable battery or other suitable power storage device, for example a rechargeable lithium ion, nickel metal hydride, or other similar battery, or supercapacitor (very high capacitance capacitor). A light pipe 64 is exposed on the upper surface of each light accessory to transmit light from the exterior of the housing to a light intensity sensor located on an interior circuit board. A manual power switch 58 permits the user to power down the device when not in use, as when the walker will be stowed away. When in use, the power may be left on and the electronics will not activate the LEDs unless conditions indicate that the user would like the light accessory to emit light, or the walker is tipped.

Figure 6A:
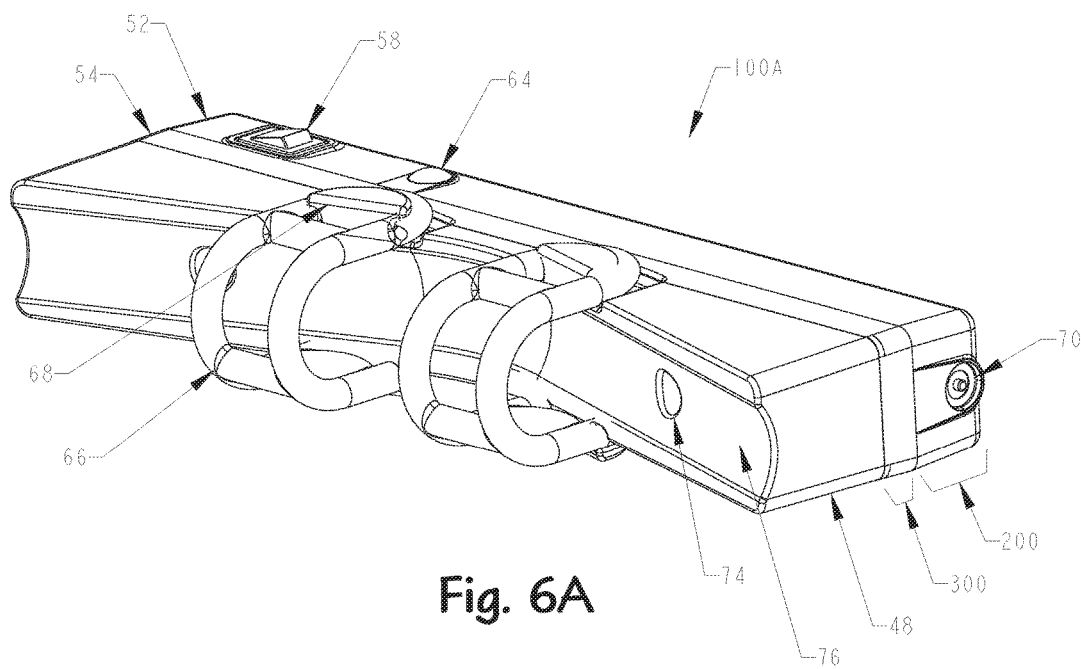
FIGS. 6A-B are rear perspective views of the light accessory apparatus illustrated by FIGS. 5A-B, respectively.
Figure 6B:
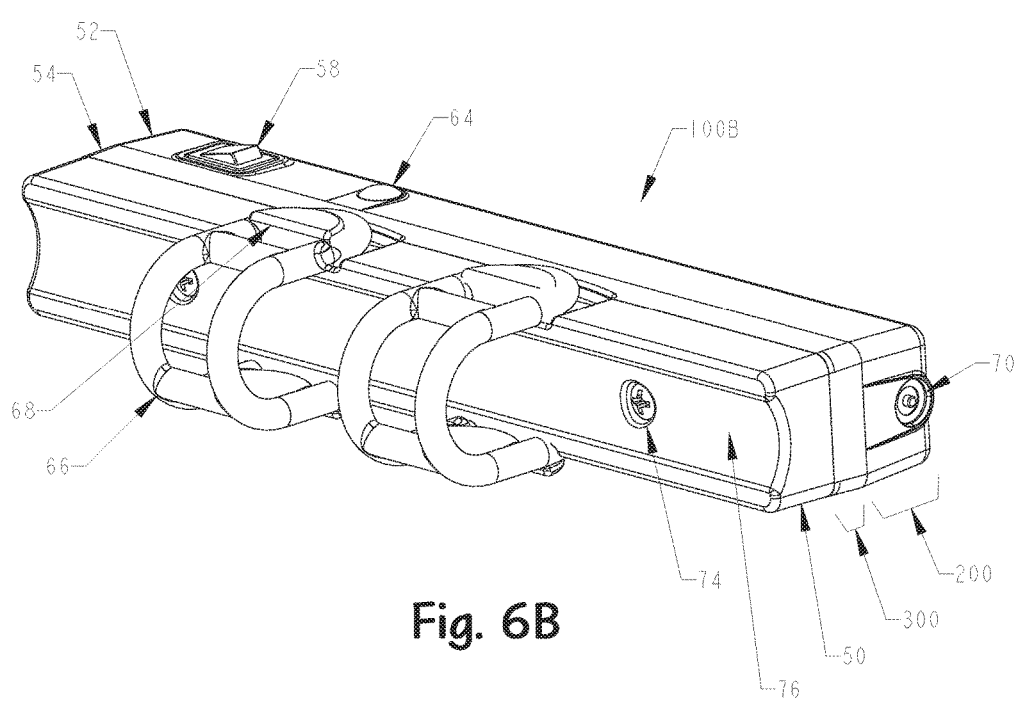
Figure 7A:
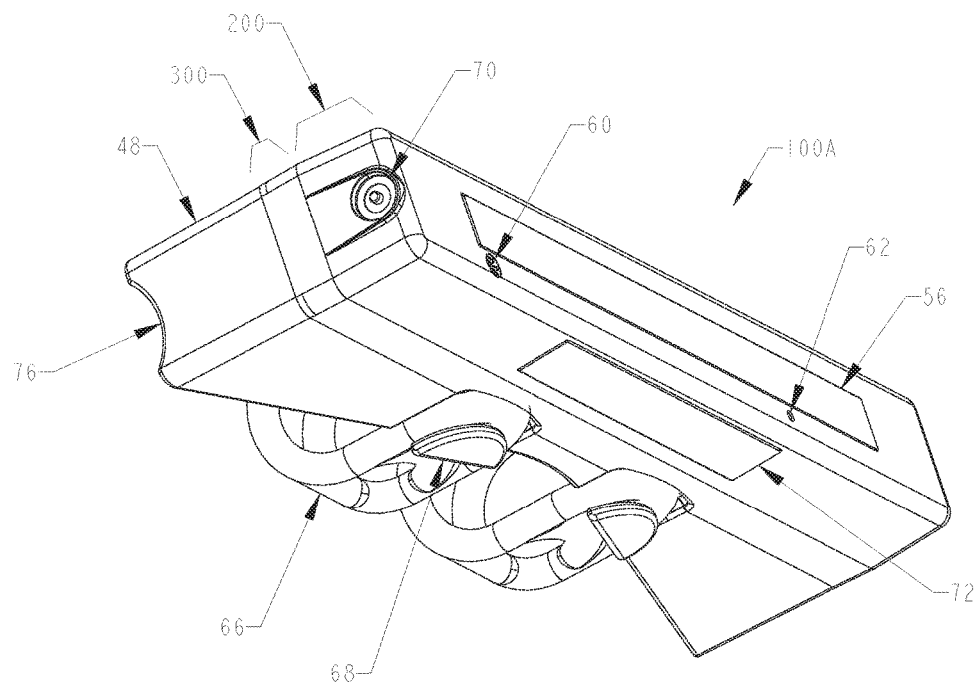
FIGS. 7A-B are lower perspective views of the light accessory apparatus illustrated by FIGS. 5A-B, respectively.
Figure 7B:
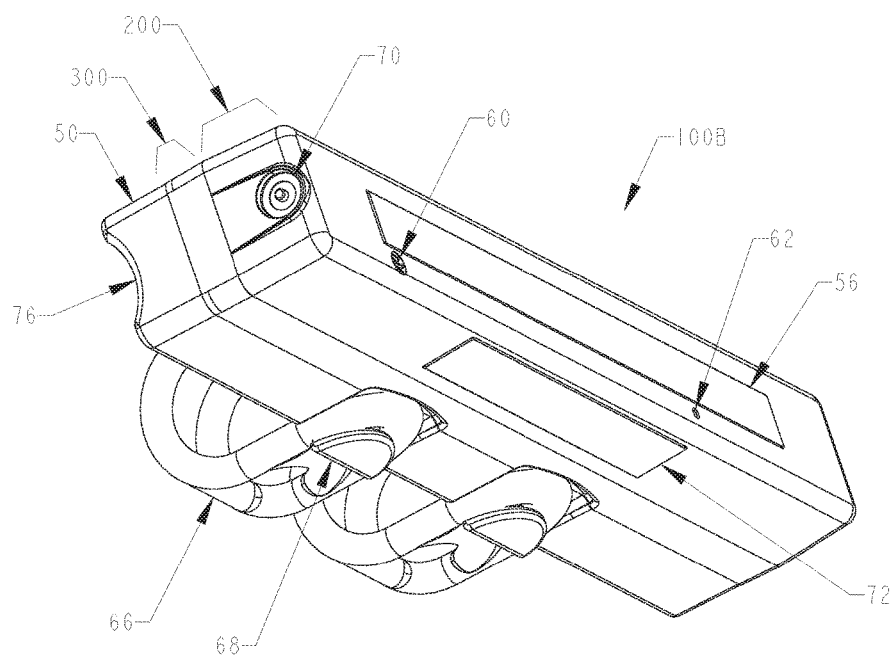
Figure 8A:
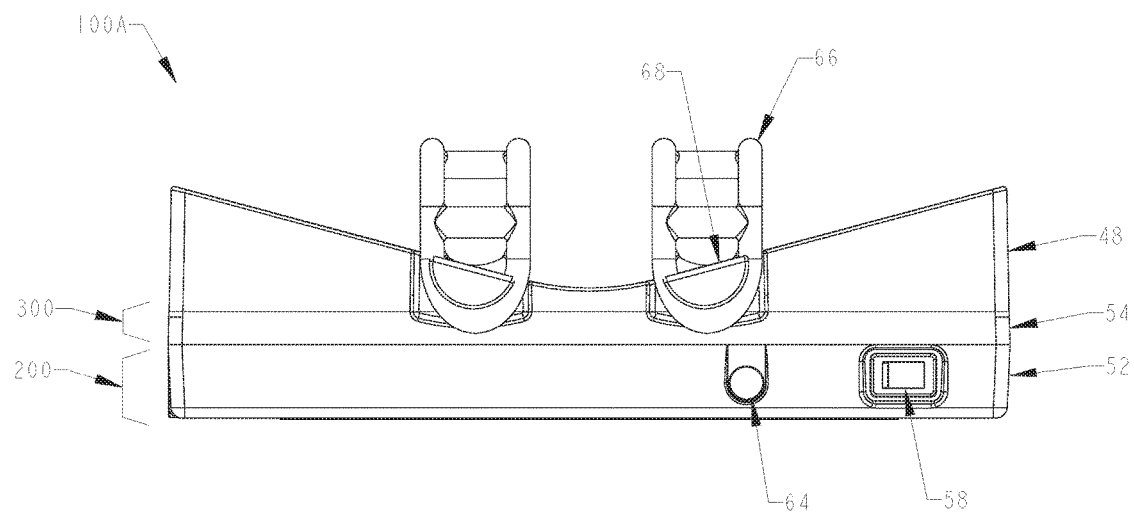
FIGS. 8A-B are top views of the light accessory apparatus illustrated by FIGS. 5A-B, respectively.
Figure 8B:
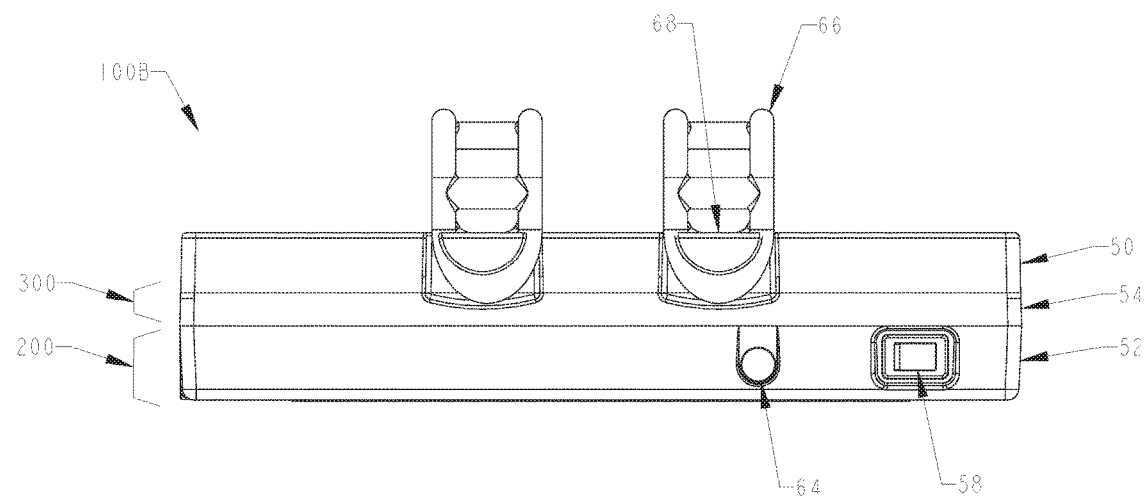
Figure 9A:
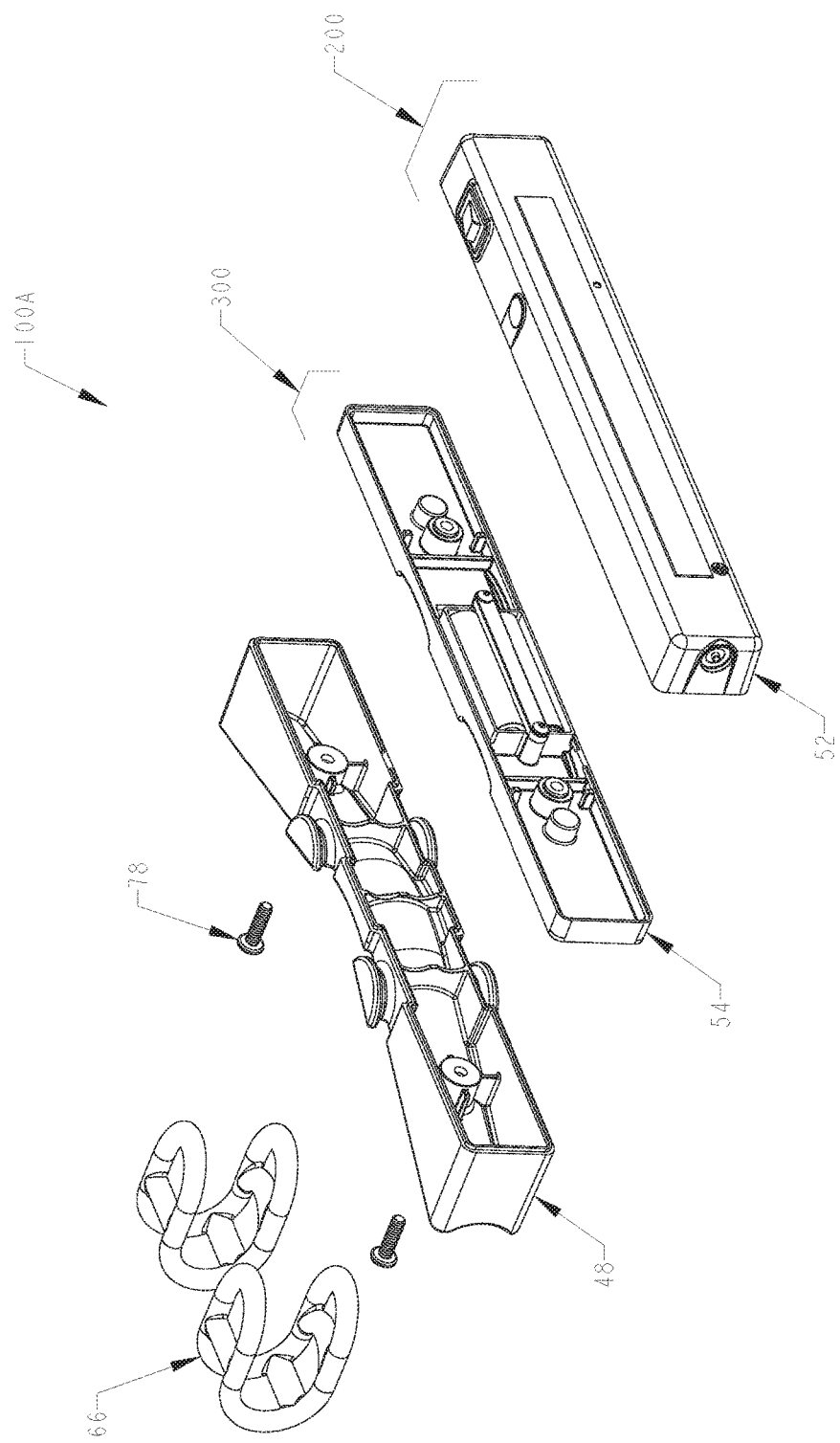
FIGS. 9A-B are exploded front perspective views of the light accessory apparatus illustrated by FIGS. 5A-B, respectively.
Figure 9B:
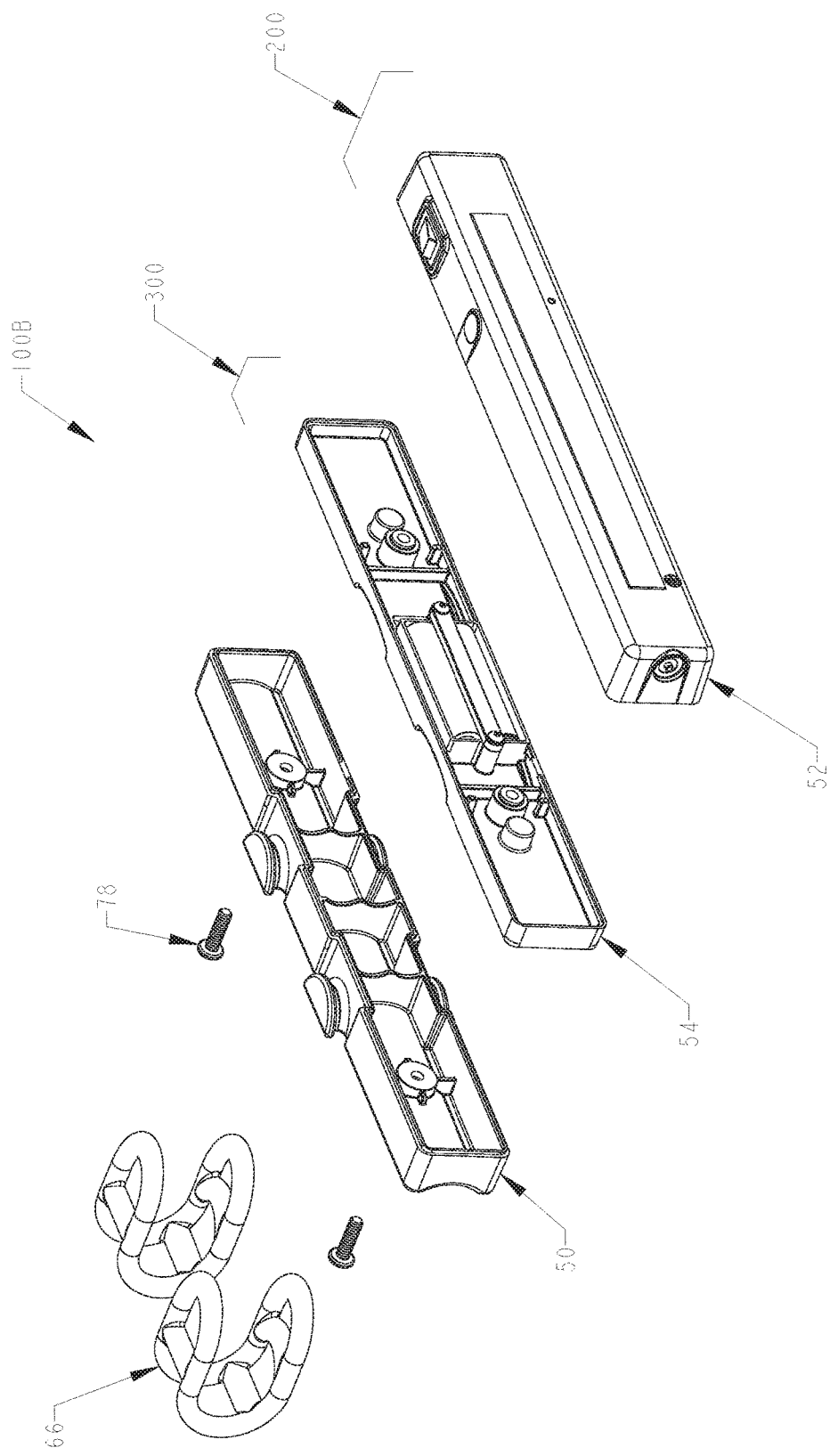
Figure 10A:
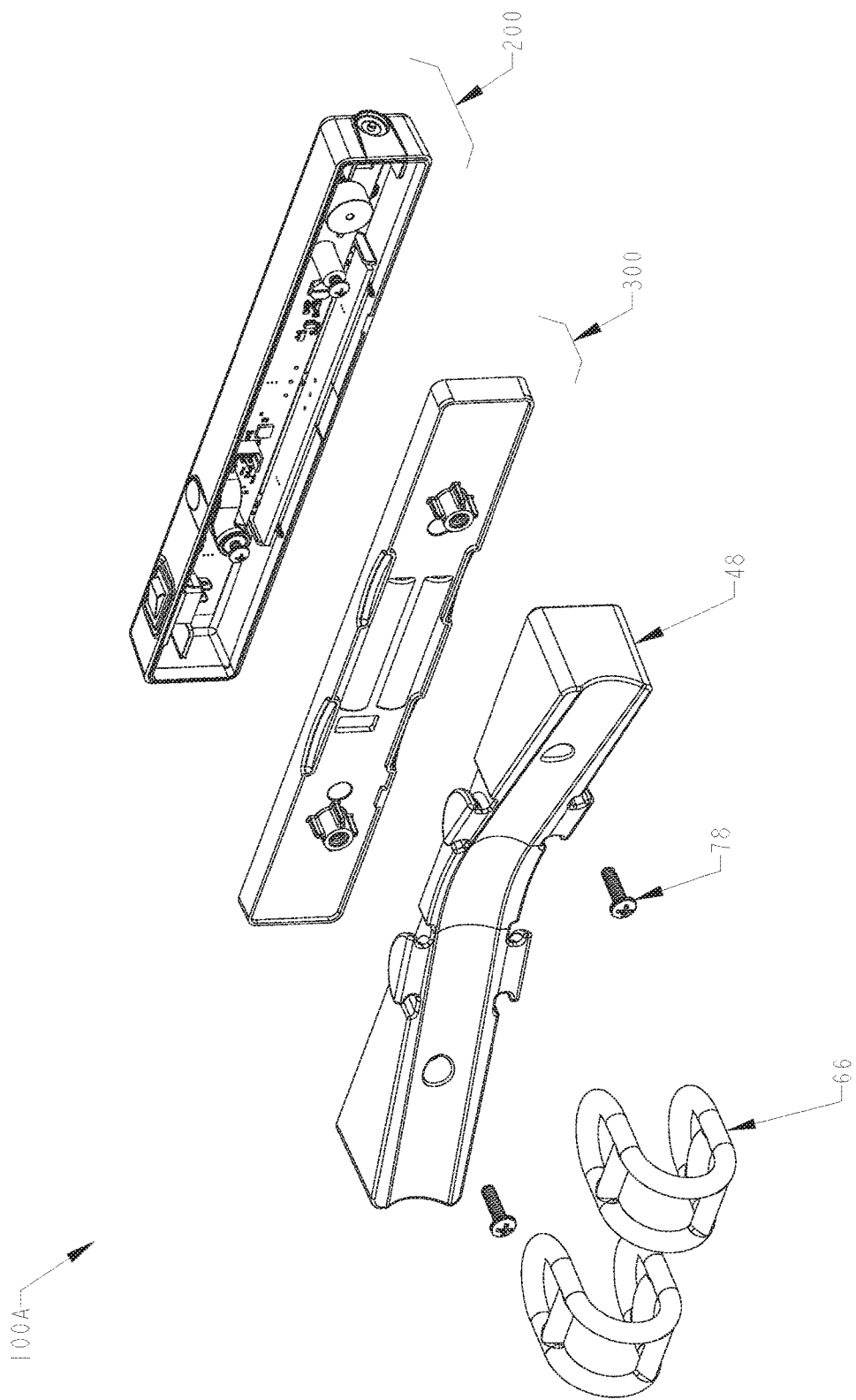
FIGS. 10A-B are exploded rear perspective views of the light accessory apparatus illustrated by FIGS. 5A-B, respectively.
Figure 10B:
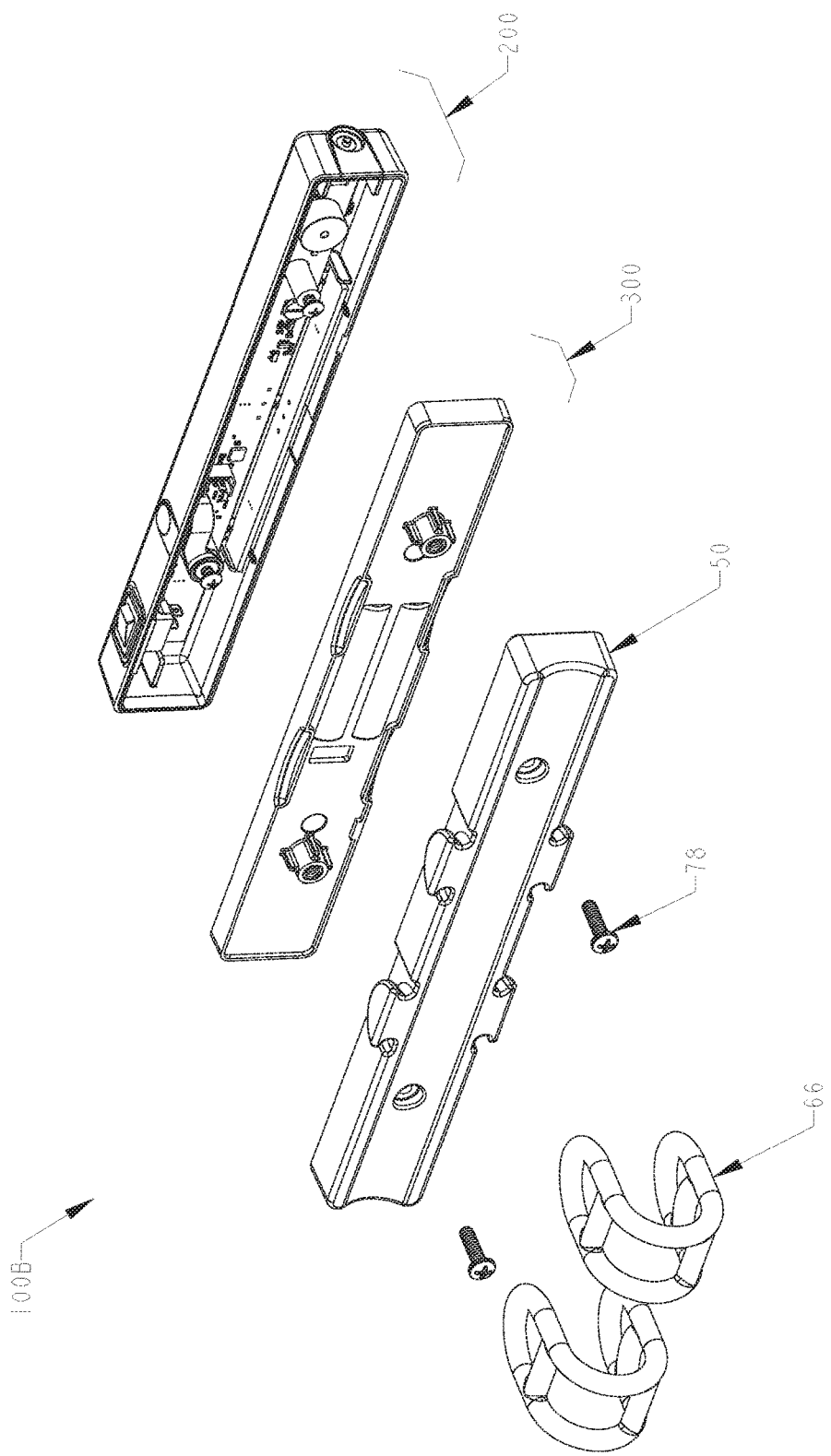

Referring to FIGS. 6A-6B showing a rear perspective view of the light accessories 100A, 100B. The rear adaptors 48, 50 each include a cylindrically concave surface 76 configured for engaging tubular cross member 34, 36 of a walker. The rear adaptors may also include a counter bored recess for threaded fasteners 78 used to hold the light accessories 100A, 100B together. Strap attachments 68 are used to secure the assemblies 100A, 100B to a walker of compatible type, and are secured to the rear adaptor 48, 50 by lugs 68 that may be molded with or otherwise secured to the rear adaptor. Referring to FIGS. 7A-7B, the lugs 68 on the under surface of the light accessories 100A, 100B are visible. Also visible is the transparent bottom cover 72, that protects and insulates the LEDs installed directly beneath it. Referring the FIGS. 9A-10B, the same components as shown in FIGS. 5A-8B are shown in exploded form.

Figure 11:
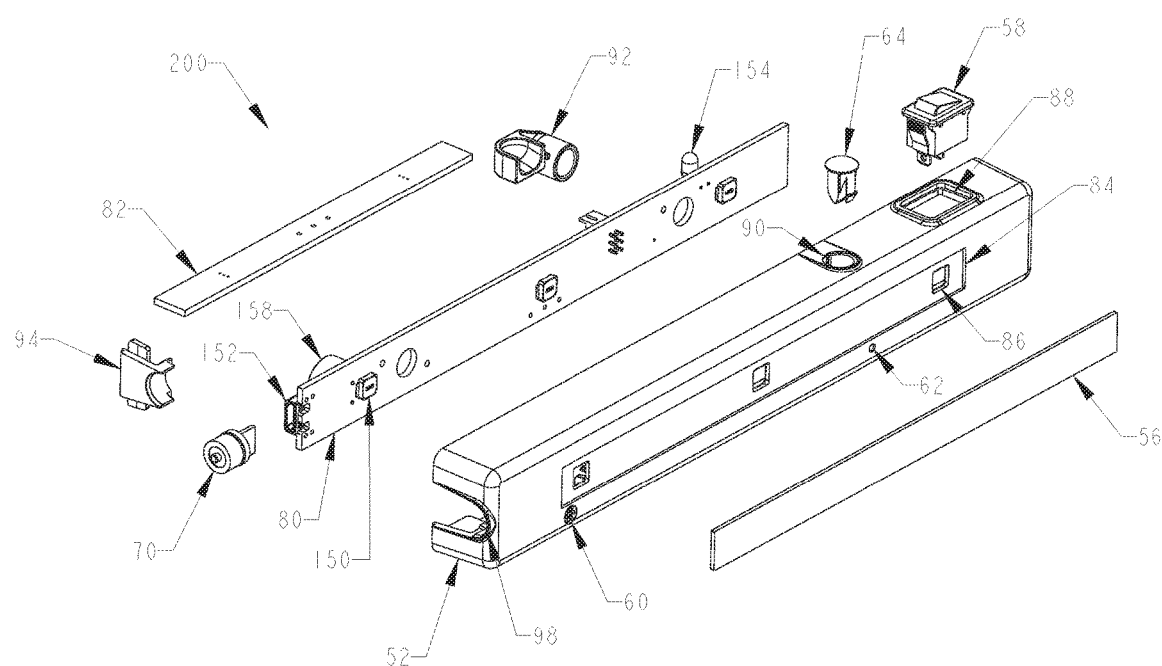
FIG. 11 is an exploded front perspective view of a front-facing light-emitting portion of a light accessory apparatus illustrated by FIG. 1A, showing components that are inside or integrated to the housing of the apparatus.
Figure 12:
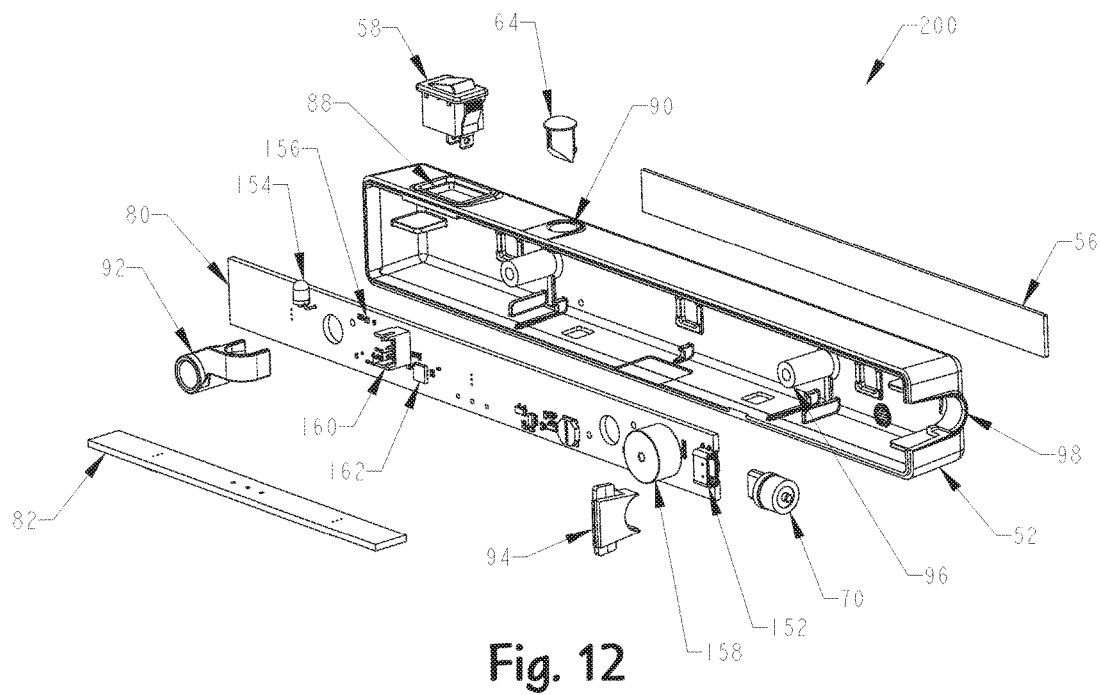
FIG. 12 is an exploded rear perspective view of the light-emitting portion of a light accessory apparatus illustrated by FIG. 11.

FIGS. 11 and 12 are front and rear perspective views showing additional interior components of the front housing assembly 200. Through hole 90 in the front housing 52 facilitates installation of the lightpipe 64 for the ambient light sensor 156. The through hole 88 facilitates installation of the rocker switch 58. Through holes 86 facilitate light emission from the front-facing LEDs 150 mounted to the main PCB 80. Screw boss 98 with the strain relief clamp 94 facilitates installation and use of the magnetic charging receptacle/adaptor 70 that couples to a USB port 152 on the main PCB 80. 92 is a specially shaped shroud for the ambient light sensor 156, to block internal light leakage from the LEDs 150 that might otherwise cause the sensor 156 to erroneously detect ambient light. The main PCB 80 couples to a secondary PCB 82 that holds the downward-facing LEDs, not visible in these views. An indicator light 154 may be used for any desired user interface function, for example, indicating a low battery state, and/or a power on state. A low battery light indicator 154 may be used to indicate to user that the battery life is nearing the end of its charge and should be connected to a charging source to recharge prior to continued use. An electrical connector 160 may be provided on the main PCB 80 to enable programming of the microcontroller 162, if desired. A speaker 158 may be used to emit sounds from the light accessory, for example a fall or tip alarm, or sound to inform the user of a machine state (e.g., beeping when tipped or powered on).

Mounted to the PCB's 80, 82 are a series of light modules 150. In the preferred embodiment, the light modules 150 comprise a plurality of light emitting diodes (LEDs). LEDs are energy efficient, compact, have extremely long life, and produce less heat. The LEDs may comprise forward emitting LEDs, downward emitting LEDs, or any combination thereof. To enhance forward and downward illumination, LEDs may also comprise high brightness or super high brightness clear LEDs. The lighting devices 150 may be permanently soldered to the PCB's 80, 82 or alternatively comprise a plug-in type configuration that allows for easy repair or replacement. Hardware and/or software for controlling the LEDs may use a method called PWM (pulse width modulation) to further save energy by pulsing the LEDs on/off at a frequency too fast for the human eye to detect. This pulsing on and off for very small fractions of a second can save considerable energy but can also affect the brightness of the LEDs. So the PWM parameters are a combination of brightness and energy efficiency and must be adjusted accordingly. PWM may be used to provide a more gradual brightening or dimming of the LEDs in response to changes in ambient lighting conditions, and provide the user with more time to gradually adjust to changes in the LED lighting and in the ambient lighting.

Further, light accessories 100A, 100B may each include a recharging system where the front housing 52 includes a charging port 70 and requisite electronics USB connector 152 coupled to a DC charging circuit for electrically charging batteries. Light accessories 100A, 100B may also include a solar cell array or panel (not shown) that is integrated into the top surface of the front and rear housings 52, 48, 50 respectively and used for charging the power source. The main PCB 80 may further include a wireless transceiver and control processor that enable the microcontroller to wirelessly connect to a computer network to enable advanced capabilities. Advanced capabilities may include, for example, couple the fall alarm system to a communication system used for reporting falls to a monitoring service, to a house alarm, or other system, using a wireless protocol such as WiFi or Bluetooth. Advanced capabilities may further include enabling the user to control functions of the walker or to set it into a desired operating mode using a computer, smart phone, or similar device.

Figure 13:
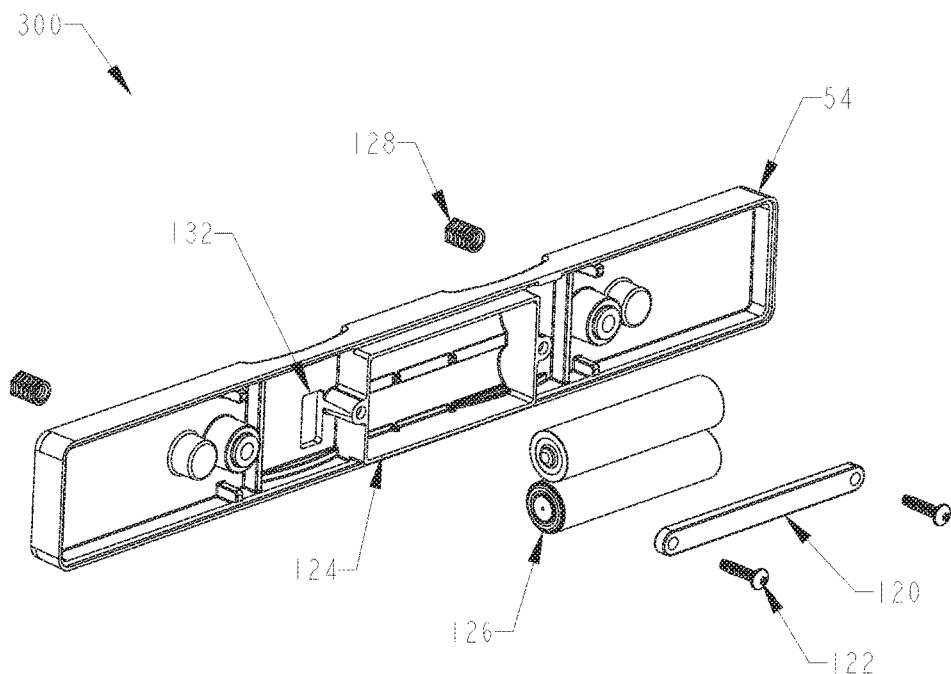
FIG. 13 is an exploded front perspective view of an internal battery-holding portion of a light accessory apparatus illustrated by FIG. 1A, showing additional components that are inside or integrated to the housing of the apparatus.
Figure 14:
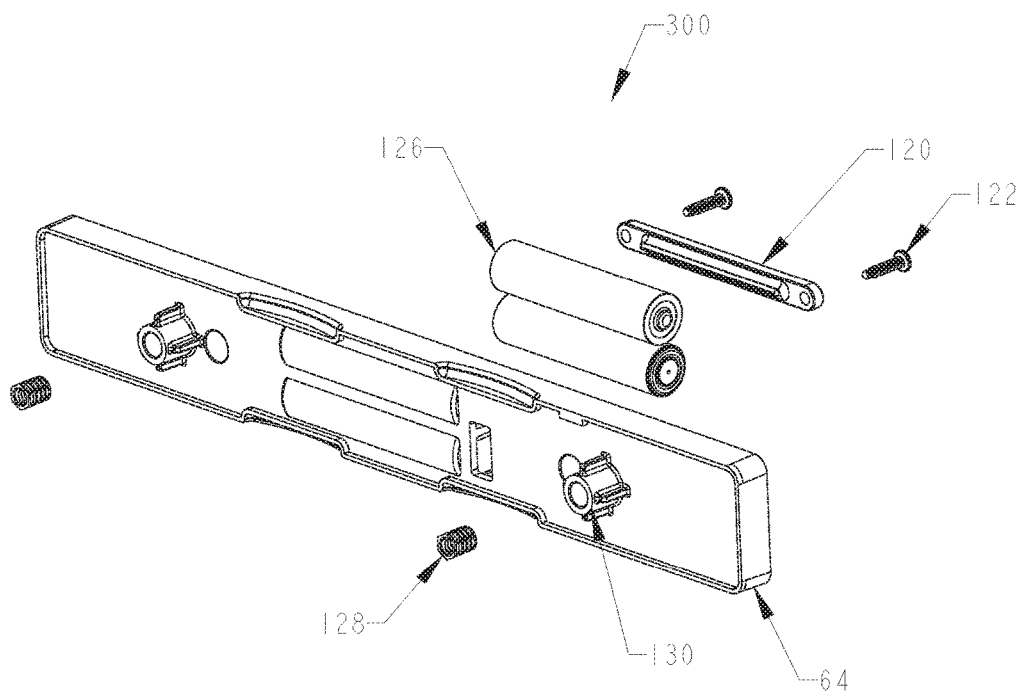
FIG. 14 is an exploded rear perspective view of the battery-holding portion of a light accessory apparatus illustrated by FIG. 13.

FIGS. 13 and 14 are front and rear perspective views showing additional interior components of the middle housing assembly 300. The power source may include one or more batteries 126 that is/are electrically coupled to power the plurality of LEDs 150. Batteries 126 may include lithium ion, nickel metal hydride, or alkaline batteries comprising rechargeable or non-rechargeable batteries. The battery(s) may be stowed in a battery holder 124 that stabilizes and retains the batteries to prevent movement and rattling around caused by vibrations that are produced as the walker is pushed along. The battery holder may be stabilized and retained by clips 120 or other features such as screws 122. Threaded inserts 128 may be provided in insert bosses 130 for mating with assembly fasteners 78. In one alternative embodiment, the plurality of batteries may be replaced with a single rechargeable battery pack. An access hole 130 may be provided to provide access to the programming connector 160.

Figure 15:
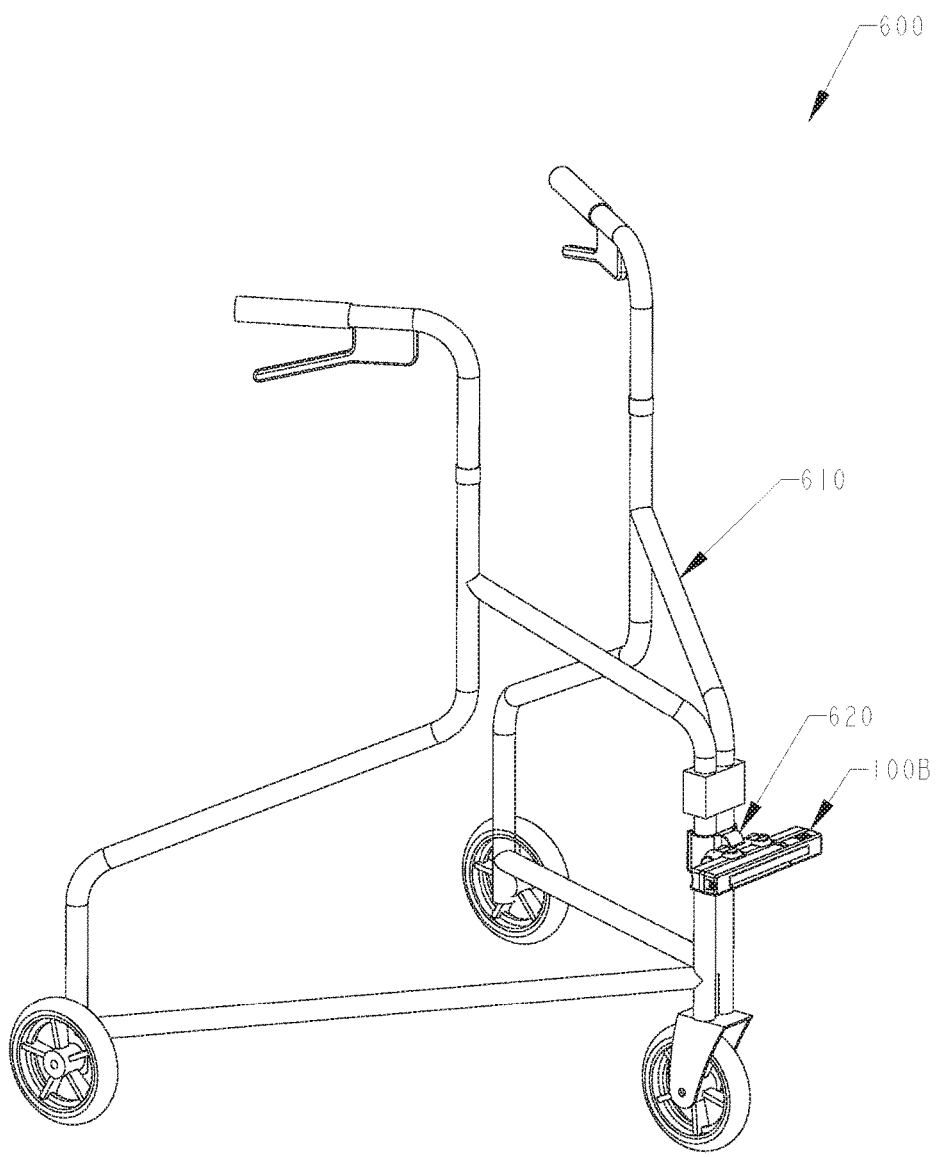
FIG. 15 is a perspective view showing another embodiment of a system including a light accessory apparatus attached to a walker of tricycle type.
Figure 16:
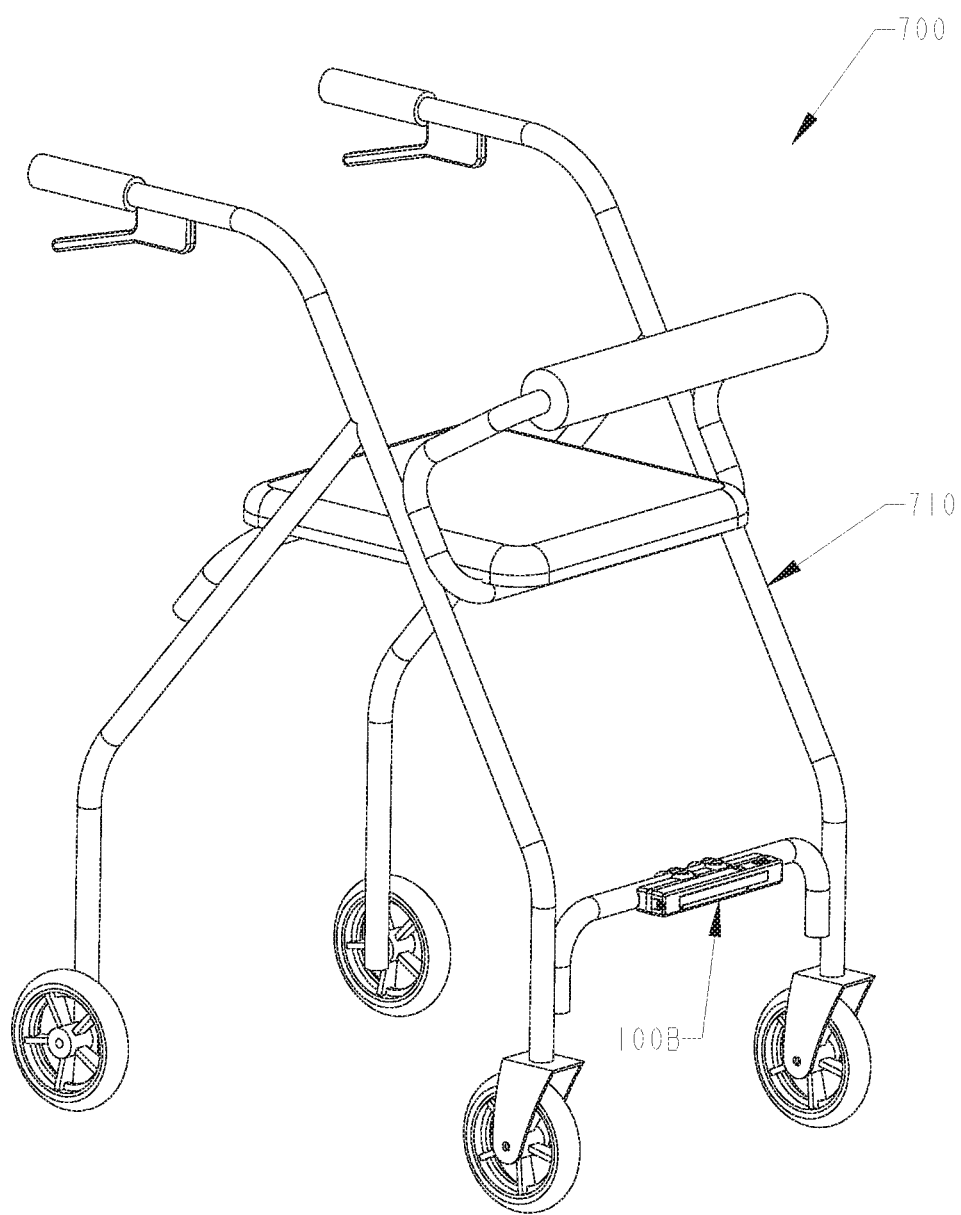
FIG. 16 is a perspective view showing another embodiment of a system including a light accessory apparatus attached to a walker of a type with an integrated platform or seat.

Referring to FIG. 15, a system 600 includes a 3-wheeled walker 610 coupled to a light accessory 100B via an adaptor 620. The adaptor 620 fastens to a vertical leg of the walker 610, and holds a horizontal cylindrical tube matching the diameter of the crossbar 36 (FIG. 2B). Hence, the light accessory can be attached to the tube using its standard attachment straps 66 made of an elastomeric material (e.g., rubberized polymer).

Figure 17:
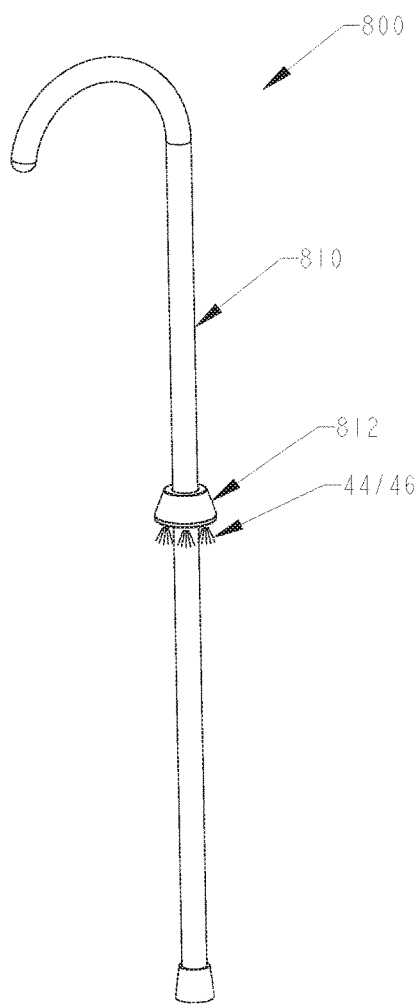
FIGS. 17-18 are views showing another embodiment of a system including a light accessory apparatus attached to a mobility-assistance cane.
Figure 18:
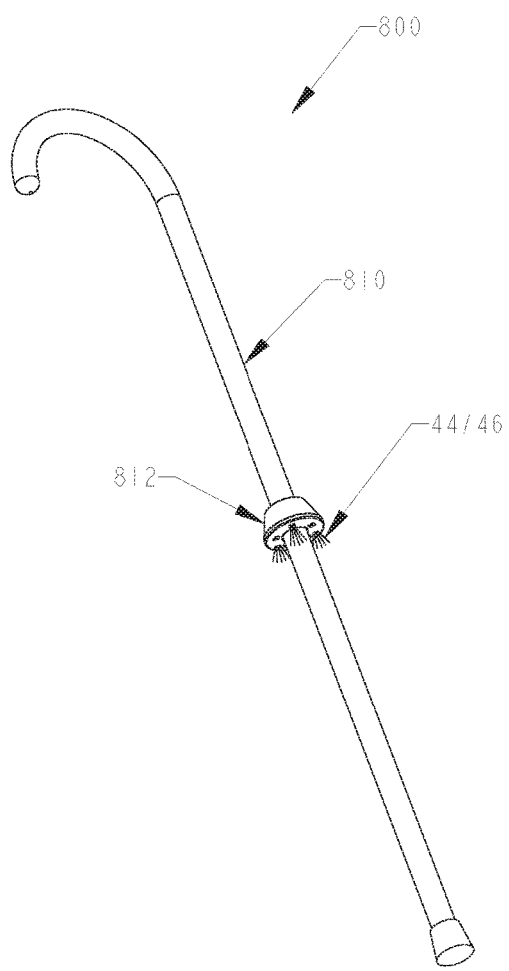

FIGS. 17 and 18 show additional embodiments of a system 800 including a walking cane 810 coupled to an annular light accessory 812 with downward facing LEDs 46 and one or more forward facing LEDs 44. The forward direction may be determined by the hook on the upper can end. The annular light accessory 812 may include sensors and operational features as described for the walker light accessories 100A, 1006.

Figure 19:
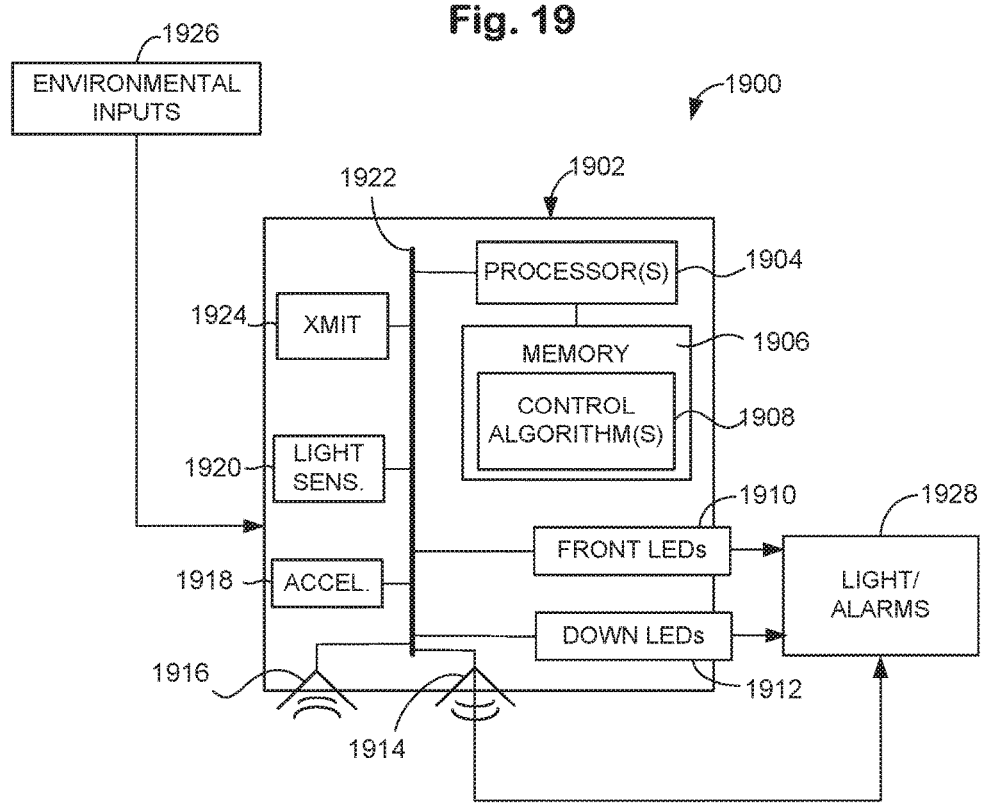
FIG. 19 is a functional block diagram illustrating aspects of a control circuit for controlling operation of a light accessory apparatus.

FIG. 19 is a functional block diagram illustrating aspects of a system 1900 including a control circuit 1902 for controlling operation of a light accessory apparatus, e.g., the accessories 100A, 1006, 812. The control circuit 1902 may include one or more computer processors 1904, for example, a microprocessor or microcontroller, coupled to a computer memory 1906. The computer memory may hold encoded instructions for executing control algorithms 1908 of the light accessory. When the encoded instructions are executed by the processor 1904, environmental inputs detected by various sensors coupled to the control circuit 1902 cause the output LEDs 1910, 1912 to emit light, or via the speaker 1914, to emit a sound, such as an alarm or light 1928. The processor 1904 may be coupled to various environmental sensors via a bus 1922. The sensors may include a microphone 1916 for detecting ambient sounds, or in more advanced control circuits, for enabling control by speech input. The sensors may include an accelerometer 1918 (or multiple accelerometers) for detecting movement of the apparatus, including very slight movements such as caused by user touch, or larger movements as when the user falls and the walker tips over. The same accelerometer may be used for both purposes. In the alternative, separate accelerometers or tilt sensors (also called tip sensors) may be used. The sensors may include a light sensor 1920 for detecting ambient light levels. Optionally, the circuit 1902 may include a transmitter 1924, or a transceiver, for wireless communication to a computer network or device. Other sensors may also be included, for example a GPS locating receiver or the like.

FIG. 20 is a flow chart illustrating aspect of a method or methods 2000 for controlling operation of a light accessory apparatus, e.g., the accessories 100A, 1006, 812. Although shown in a logical sequence, it should be appreciated that the diagramed operations may be performed in parallel to achieve similar results. Also, the order of certain operations may be varied in some cases without departing from the functionality provided, and certain operations may be added or omitted. At 202, the apparatus is powered on. At 2004, the control circuit is initialized to a "lights off" state prior to analyzing sensor input. An 2006, the control circuit checks all sensor inputs, including, for example, ambient light, ambient sound, movement, and inclination of the walker. At 2008, the processor analyzes the sensor input and determines whether or not the walker is tipped over. If a tipped condition is detected, the processor activates an alarm 2010. In more advanced models, this may include sensing an alarm signal to a computer network, for purposes of summoning help. If the walker is not tipped and the processor does not detect a tipped condition, a previous alarm may be deactivated at 2012, if applicable.

At 2014, the processor determines by a state machine whether or not the light circuits of the apparatus are 'on.' For example, it may flip a bit register whenever the LEDs are energized, or it may read a pin voltage that indicates whether or not the LEDs are energized. If the lights are currently 'off', at 2016 the processor analyzes the sensor input and determines whether movement of the apparatus, or ambient sound, indicates that its light should be turned on. For example, if an accelerometer signals movement consistent with a user grabbing, bumping or touching the walker, the processor may signal movement 'yes.' For further example, if the processor detect the sound of a clap, or a spoken word, it may signal ambient sound 'yes.' Either or both of sound or movement may be used. If no sound or movement is detected, the apparatus remain in a 'wait' state and reverts to the sensor check process 2006. If sound or movement is detected at 2016, then the processor analyzes the sensor input and determines an ambient light level, at 2022. The processor may compare a detected light level, or average of detected levels, to a threshold value 'T1.' If the detected light is less than the threshold value T1, then the processor may activate the light circuits at 2024, and then revert to waiting and continue sensor check at 2006. If the detected light is greater than the threshold T1, than the processor may revert to the wait state and continue sensor checking at 2006, without activating the light circuits.

Referring back to block 2014, if the processor determines that the light circuits of the apparatus are 'on', the processor may analyze the sensor input and determine an ambient light level, at 2018. In the decision process 2018, the processor may use a higher threshold value 'T2' than used in the decision process 2022 during the 'lights off' state. In other words, T2 may be greater than T1, so that feedback from the apparatus' own light emissions does not cause the processor to immediately deactivate the light circuits, causing flickering. Instead, the threshold value for the 'lights on' condition is set higher, because it is expected that the light provided by the apparatus' own light output will raise ambient light levels somewhat. If the ambient light is above the higher threshold T2, then the processor deactivates the apparatus light circuits, at 2020. After deactivating the lights, or if the detected light is too low to trigger deactivation, the processor reverts to the wait state and continues sensor checking at 2006. The process 200 can continue indefinitely, until the circuit is powered off (e.g., by the rocker switch 58).

The foregoing structure, apparatus, systems and methods provide certain advantages for users of walkers and other mobility aids. The resulting product is essentially a "smart" lighting product that illuminates the periphery of a walker. Three forward-facing and two downward-facing super high-brightness low-power LEDs provide a great deal of peripheral illumination for the user so they can see where they are walking if they have to use the bathroom in the middle of the night, or if they are walking from a restaurant to their car after dark.

The device senses ambient light and responds to both movement and sound. So all a user has to do to turn the light on is touch the walker or clap their hands. The lights will turn on/off based upon predetermined brightness thresholds sensed by an ambient light transducer.

The walker light uses a rechargeable Li-Ion battery to provide for several days of standby time. A USB charging jack magnetically attaches to the device with low pull-away force to prevent the USB charging cable from becoming a trip hazard (as it will easily pull away from the device and fall to the floor with little or no tension). A low battery light (red LED) is placed below the top surface of the enclosure to indicate a low battery condition. The light will diffuse through the plastic and "glow" red when the device needs to be charged. That being said, the user does not have to wait for the red LED to glow in order to charge the device. It can be charged any time.

Pulse width modulation (PWM) is used to drive the LEDs to provide high brightness output with low power consumption. The algorithm has been constructed to prevent the flickering of the LEDs in a lighting condition that is on the threshold of light and dark.

The device has a tip (or tilt) warning alarm with flashing lights and audible beeping to alert one's spouse and/or caregiver in the event that the walker partially or fully tips over. The same electronic hardware/software trigger/algorithm may be used to link the device with a monitoring service via a wireless interface.

Attachment to a walker is very easy as there are two rubber straps that wrap around the front bar of the walker. No tools or complicated assembly is required, unless the adaptor has to be swapped out to accommodate an alternate style of walker. In this case, two screws may be removed from the rear of the device with a screwdriver or the like to detach the one adaptor and the screws may be used to attach the alternate adaptor. The depicted adaptors 48, 50 are primarily for two main styles of walkers: "V" bar and Straight bar. The "V" bar style may be the most common, however, adaptors can easily be provided to accommodate other styles.

The walker may be folded up with the device still attached so that the walker can be placed into the trunk of a car. There is a main power switch on the device to completely shut down the power so that the device does not "think" that it is tipped over while in the trunk of a car (with flashing lights and beeping).

Users do not have to manually control the light when using this product. All the user has to do is use the walker normally and the illumination will turn on and off when it has to . . . the device thinks for itself and "knows" when to turn on or off, using logic such as diagrammed in FIG. 20. Charging is nearly effortless, using magnetic charging cable attaches to the charging receptacle on the device magnetically. That is what holds the charging cable to the receptacle . . . no friction or mechanical engagement other than surface-to-surface contact between magnets, providing conductive coupling by actual contact between electrical conductors at the receptacle. In the alternative, or in addition, an inductive coupling may be used for charging, eliminating the need for a conductive coupling. The illustrated light accessory, systems, and methods will instill more confidence and independence in the users as well as prevent and/or reduce head injuries, bone fractures, and other debilitating and costly injuries resulting from falls.

In one or more exemplary designs, control functions of the described universally attachable light accessory apparatus for use with mobility aids for example light and alarm control algorithms, may be implemented in hardware, software, firmware, or any combination thereof. If implemented in software, the functions may be stored as one or more instructions or code on a non-transitory computer-readable medium. Computer-readable media includes computer storage media or any other non-transitory tangible medium that facilitates holding a computer program in storage or machine memory. By way of example, and not limitation, such computer-readable media can comprise RAM, ROM, EEPROM or other solid-state memory devices; CDROM, DVD, Blu-ray or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Combinations of the above should also be included within the scope of non-transitory computer-readable media.

All of the embodiments described herein are examples provided to enable persons skilled in the art to make or use the novel aspects of the disclosure, and are not intended to limit the scope of the invention, which is defined by the claims. For purposes of description herein, the terms "upper," "lower," "left," "rear," "right," "front," "vertical," "horizontal," and derivatives thereof, relate to the system or apparatus as assembled to the walkers shown in FIGS. 1A-B from the perspective of an ordinary user.

Having thus described embodiments of an attachable light accessory for a walker, and systems and methods for its use, it should be apparent to those skilled in the art that certain advantages of the apparatus, systems and methods have been achieved. It should also be appreciated that various modifications, adaptations, and alternative embodiments thereof may be made within the scope and spirit of the present invention. For example, systems using specific types of mobility aids been illustrated, but the inventive concepts described above would be equally applicable to use of other types of mobility aids, or to variations on the attachable light accessory within the scope of the disclosure. The invention is defined by the following claims.

The invention claimed is:

1. A light accessory attachable to a walker, the light accessory comprising:
   a housing having one or more walls defining a cavity;
   a power source disposed within the cavity;
   a plurality of light modules disposed in the cavity and oriented for emitting light outward from the one or more walls, for illuminating a forward and downward direction when walking with the walker; and
   a controller coupled to a memory and to a plurality of sensors, the plurality of light modules, the controller and the plurality of sensors electrically coupled to the power source, where the memory holds encoded instructions, that when executed by the processor, causes the apparatus to receive sensor input indicating ambient light and at least one of motion of the apparatus or sound impinging on the apparatus, to activate the plurality of light modules, based on receiving the sensor input indicating that ambient light is less than a first threshold and that at least one of motion of the apparatus or sound is detected, and to deactivate the plurality of light modules while the light modules are active, based on receiving the sensor input indicating that ambient light is greater than a second threshold regardless of whether or not at least one of motion or sound is detected, wherein the second threshold is greater than the first threshold.

2. The light accessory of claim 1, wherein the memory holds further instructions for receiving sensor input indicating a tilt exceeding a threshold tilt angle.

3. The light accessory of claim 2, wherein the memory holds further instructions for generating an audible alarm, based on receiving the sensor input indicating a tilt exceeding a threshold tilt angle.

4. The light accessory of claim 2, wherein the memory holds further instructions for generating a wireless information signal for a computer, based on receiving the sensor input indicating a tilt exceeding a threshold tilt angle.

5. The light accessory of claim 1, wherein the memory holds further instructions for generating a wireless information signal for a computer, based on receiving the sensor input indicating a tilt exceeding a threshold tilt angle.

6. The light accessory of claim 1, wherein the controller comprises any one of a microcontroller, a processor, a microprocessor, or a minicomputer.

7. The light accessory of claim 1, wherein the plurality of sensors comprise a bump sensor, a tip sensor, a sound sensor, and a light sensor.

8. The light accessory of claim 1, further comprising a removeably attached adaptor mount along another wall of the housing, the adjustable mounts configured for attaching to the front horizontal lateral structural member of the walker.

9. The light accessory of claim 1, further comprising a light pipe coupling an outer surface of the one or more walls to a light sensor disposed in the cavity.

10. The light accessory of claim 1, wherein the plurality of light modules comprise at least two LED assemblies disposed to emit light in different directions.

11. The light accessory of claim 10, wherein the different directions are at approximately right angles to each other, corresponding to downwards and forwards.

12. A method for controlling a light accessory apparatus for attaching to a mobility aid, the method comprising:
  receiving, by a processor of the apparatus, sensor input indicating ambient light and at least one of motion of the apparatus or sound impinging on the apparatus;
  activating a light-emitting circuit of the apparatus, based on receiving the sensor input indicating that ambient light is less than a first threshold and that at least one of motion of the apparatus or sound is detected; and
  deactivating the light-emitting circuit of the apparatus while the light-emitting circuit is emitting light, based on receiving the sensor input indicating that ambient light is greater than a second threshold regardless of whether or not at least one of motion or sound is detected, wherein the second threshold is greater than the first threshold.

13. The method of claim 12, further comprising receiving sensor input indicating a tilt exceeding a threshold tilt angle.

14. The method of claim 12, further comprising generating an audible alarm, based on receiving the sensor input indicating a tilt exceeding a threshold tilt angle.

15. The method of claim 12, further comprising generating a wireless information signal for a computer, based on receiving the sensor input indicating a tilt exceeding a threshold tilt angle.

16. The method of claim 15, further comprising transmitting the wireless information signal to a designated node, summoning help for a user of the mobility aid.

17. The method of claim 12, further comprising detecting a battery condition for an apparatus power source, and activating a signal light in response to detecting a low battery condition.

18. A system comprising a light accessory attached to a walker, the light accessory comprising:
  a housing having one or more walls defining a cavity;
  a power source disposed within the cavity;
  a plurality of LED assemblies disposed in the cavity and oriented for emitting light outward from the one or more walls, for illuminating a forward and downward direction when walking with the walker; and
  a controller coupled to a memory and to a plurality of sensors, the plurality of LED assemblies, the controller and the plurality of sensors electrically coupled to the power source, where the memory holds encoded instructions, that when executed by the processor, causes the apparatus to receive sensor input indicating ambient light and at least one of motion of the apparatus or sound impinging on the apparatus, to activate the plurality of LED assemblies, based on receiving the sensor input indicating that ambient light is less than a first threshold and that at least one of motion of the apparatus or sound is detected and to deactivate the plurality of LED assemblies while the LED assemblies are active based on receiving the sensor input indicating that ambient light is greater than a second threshold regardless of whether or not at least one of motion or sound is detected, wherein the second threshold is greater than the first threshold.

* * * * *